United States Patent
Park et al.

(10) Patent No.: US 7,657,099 B2
(45) Date of Patent: Feb. 2, 2010

(54) METHOD AND APPARATUS FOR PROCESSING LINE PATTERN USING CONVOLUTION KERNEL

(75) Inventors: Dong-ryeol Park, Hwaseong-si (KR); Seok-won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 709 days.

(21) Appl. No.: 11/350,847

(22) Filed: Feb. 10, 2006

(65) Prior Publication Data

US 2006/0182365 A1    Aug. 17, 2006

(30) Foreign Application Priority Data

Feb. 14, 2005    (KR)    ............... 10-2005-0012003

(51) Int. Cl.
*G06K 9/56*    (2006.01)
*G06K 9/40*    (2006.01)

(52) U.S. Cl. .................... 382/205; 382/261; 382/265

(58) Field of Classification Search ............. 382/205, 382/255, 263, 193, 209, 261, 265
See application file for complete search history.

(56) References Cited

U.S. PATENT DOCUMENTS

| | | | | |
|---|---|---|---|---|
| 5,027,413 A * | 6/1991 | Barnard | .................. | 382/103 |
| 5,237,524 A * | 8/1993 | Heinemann | .................. | 708/322 |
| 5,515,453 A * | 5/1996 | Hennessey et al. | .......... | 382/141 |
| 5,567,971 A * | 10/1996 | Jackson et al. | .............. | 257/431 |
| 6,343,139 B1 * | 1/2002 | Finkelstein et al. | ......... | 382/101 |
| 6,424,730 B1 * | 7/2002 | Wang et al. | .................. | 382/128 |
| 6,449,387 B1 * | 9/2002 | Inui | ........................... | 382/144 |
| 6,647,137 B1 * | 11/2003 | Lu | .............................. | 382/144 |
| 6,778,284 B2 * | 8/2004 | Casagrande | ................ | 356/614 |
| 6,787,749 B1 * | 9/2004 | Zhou et al. | ................ | 250/208.1 |
| 7,049,594 B2 * | 5/2006 | Wu et al. | .................. | 250/338.1 |
| 2002/0193962 A1 * | 12/2002 | Yakhini et al. | ............. | 702/127 |
| 2003/0086608 A1 * | 5/2003 | Frost et al. | .................. | 382/173 |
| 2004/0136586 A1 * | 7/2004 | Okamura | .................... | 382/137 |
| 2004/0179719 A1 * | 9/2004 | Chen et al. | .................. | 382/118 |
| 2004/0218808 A1 * | 11/2004 | Prince | ....................... | 382/150 |
| 2005/0147313 A1 * | 7/2005 | Gorinevsky | ................ | 382/255 |
| 2005/0157939 A1 * | 7/2005 | Arsenault et al. | ........... | 382/260 |
| 2006/0067591 A1 * | 3/2006 | Guzzwell et al. | ............ | 382/289 |
| 2006/0103892 A1 * | 5/2006 | Schulze et al. | ............. | 358/463 |

* cited by examiner

*Primary Examiner*—Vikkram Bali
*Assistant Examiner*—Michelle Entezari
(74) *Attorney, Agent, or Firm*—Staas & Halsey LLP

(57) ABSTRACT

A method and apparatus for processing a line pattern using a convolution kernel. An apparatus for processing a line pattern, the apparatus including a light source module radiating predetermined light and a camera module capturing an image of an object, onto which the light is radiated, the apparatus processing a line pattern included in the captured image, includes: a kernel learning unit determining a kernel shape and an optimal threshold value with respect to each vertical interval of the image using a simple line pattern formed at a predetermined location; a convolution application unit applying convolution to a captured test image using the determined kernel shape and optimal threshold value; and a region selection unit scanning each pixel column in the image, to which the convolution is applied, in a vertical direction, and setting pixel values of pixel groups other than a selected pixel group to 0 when a plurality of pixel groups having pixel values other than 0 exists.

20 Claims, 24 Drawing Sheets

$$kernel_{m,n} = [-m \ \underbrace{0 \ \cdots \ 0}_{\text{count}: \ \frac{n-m}{2}} \ \underbrace{1 \ \cdots \ 1}_{m} \ \underbrace{0 \ \cdots \ 0}_{\frac{n-m}{2}} \ -m]$$

$$\text{kernel}_{m,n} = [-m/2 \ -m/2 \ \underbrace{0 \cdots 0}_{\text{count}: \ \frac{n-m}{2}} \ \underbrace{1 \cdots 1}_{m} \ \underbrace{0 \cdots 0}_{\frac{n-m}{2}} \ -m/2 \ -m/2]$$

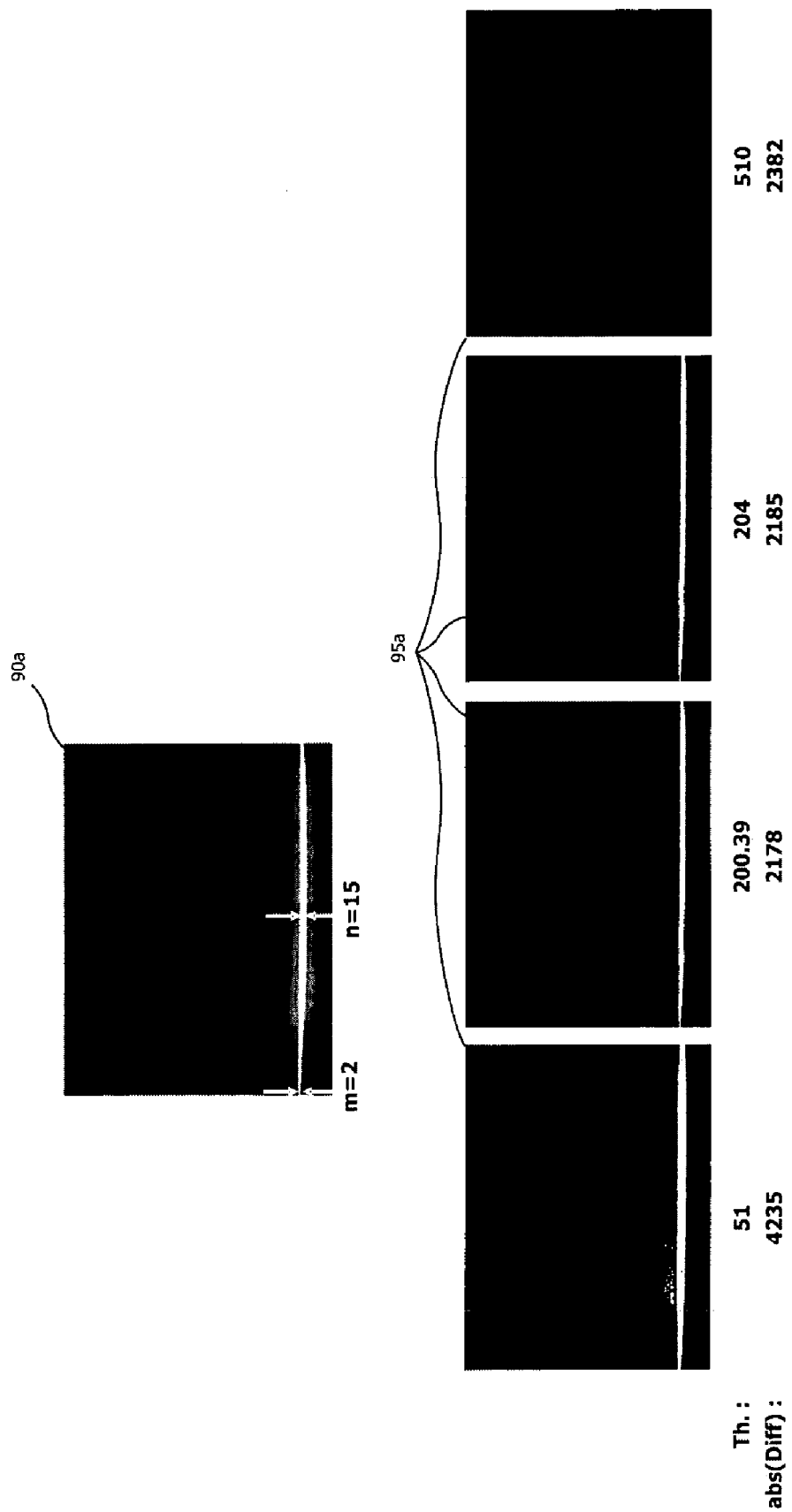

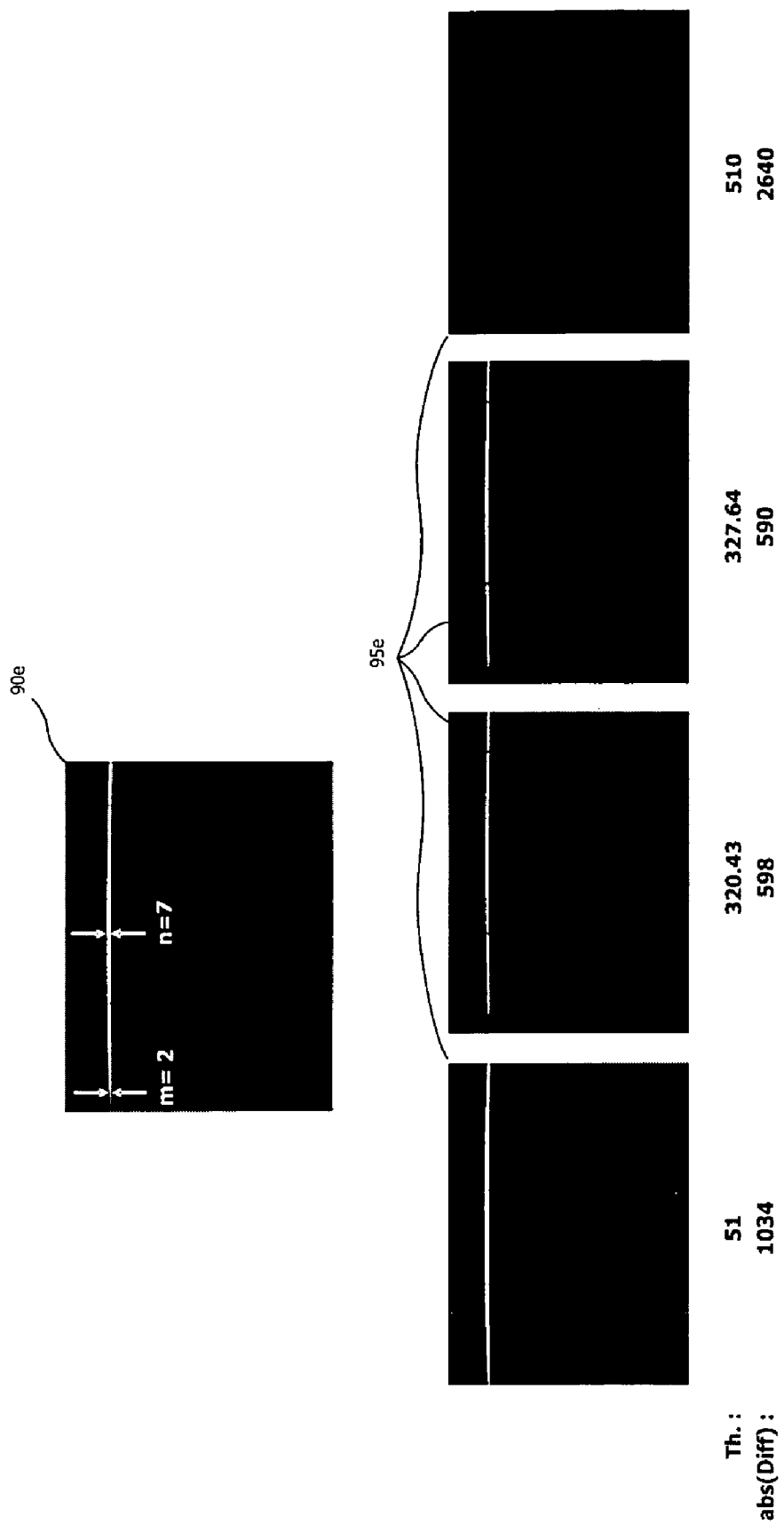

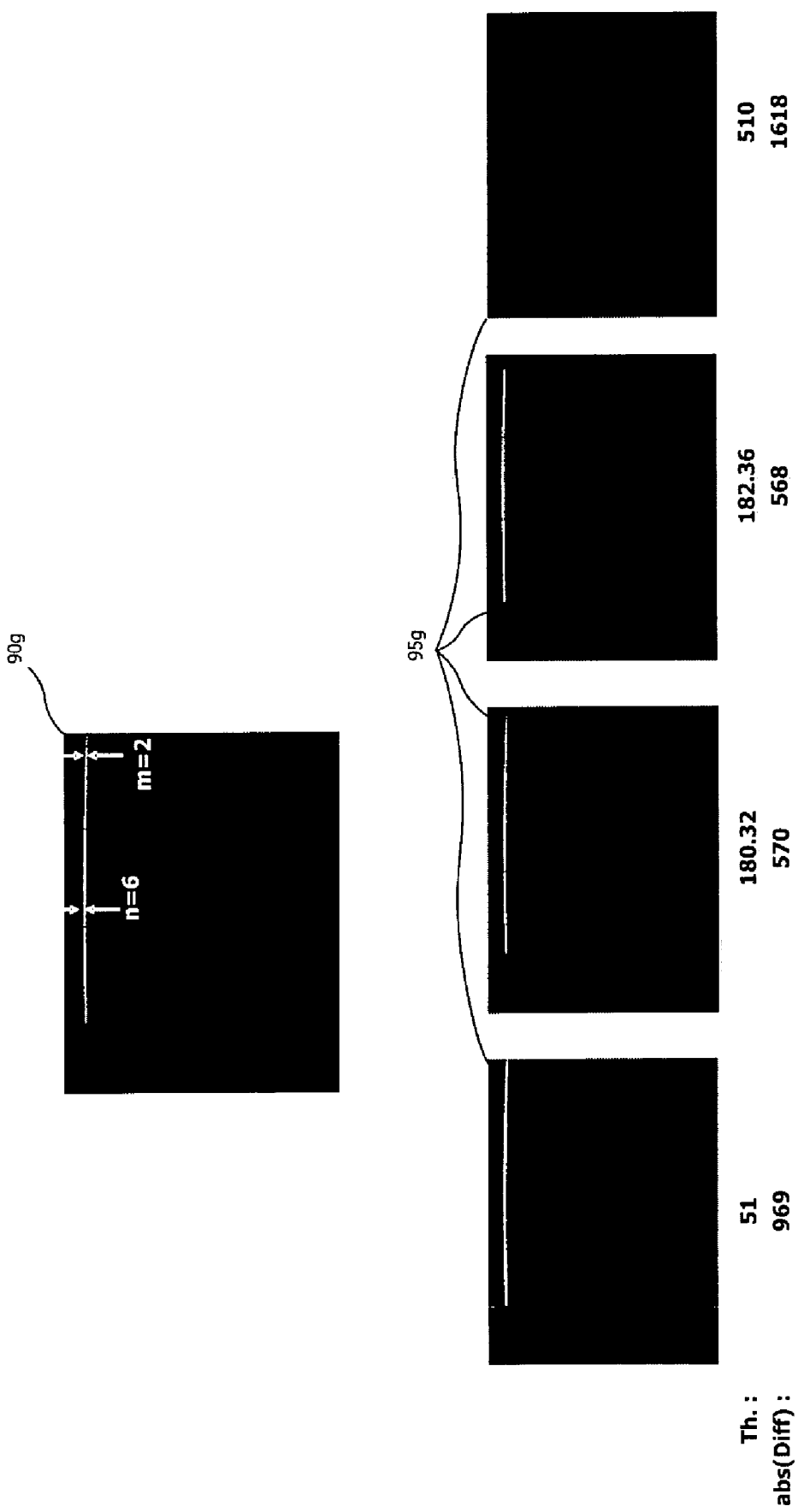

METHOD AND APPARATUS FOR PROCESSING LINE PATTERN USING CONVOLUTION KERNEL

CROSS-REFERENCE TO RELATED APPLICATION

This application claims priority from Korean Patent Application No. 10-2005-0012003 filed on Feb. 14, 2005 in the Korean Intellectual Property Office, the disclosure of which is incorporated herein by reference.

BACKGROUND OF THE INVENTION

1. Field of the Invention

The present invention relates, in general, to simultaneous localization and mapping using a structured light distance sensor, and more particularly, to a method and apparatus that process a line pattern from an image generated by structured light, thereby eliminating noise from the image.

2. Description of Related Art

A mobile robot capable of moving by itself has a wide working area, such as an outdoor area at a fixed location, or a previously structured working environment, and therefore, it is more useful than a fixed robot from the standpoint of its functionality and variable applicability. Recent mobile robots undertake the work of humans in places where humans cannot easily go, such as the deep sea or radioactive areas, thus greatly contributing to the safety of human beings.

A mobile robot needs to have capabilities, such as automatic path planning, obstacle detection and collision avoidance, which are required to perform work in a place where previously supplied information about the surrounding environment is insufficient. Recently, research has been actively conducted on "Simultaneous Localization and Map Building (SLAM)" that is technology for simultaneously automatically building a map and localizing a robot while the robot moves to locations where previously supplied information is insufficient.

In order for a mobile robot to perform SLAM, it is essential to have the ability to obtain information used for localization from the surrounding environment. Various methods using a vision sensor, an ultrasonic wave sensor, a touch sensor, and others have been applied to SLAM. In particular, a vision sensor using structured light, such as a laser, and a camera, and a three-dimensional recognition algorithm based on the visual sensor reduce the burden of calculation and can be used in a place where the variation in brightness is severe, so that the visual sensor and the three-dimensional recognition algorithm are regarded as a very efficient method.

Such a method is performed by radiating light onto an object in a predetermined form such as laser light, and obtaining an image using a sensor such as a camera. Thereafter, if the location at which laser light is reflected is captured by an obtained image, the distance between the location at which laser light is emitted and the location at which laser light is reflected can be calculated through a triangulation method based on the coordinates of a camera image, a scan angle at the location, and the distance between the camera and the location of the laser. Such a triangulation method refers to a method of converting the distance between the laser and the laser light reflection location (location of the object), and the distance between the laser and the camera into a geometrical relationship, and obtaining the required distance.

A structured-light distance sensor is a device for sensing the distance to an obstacle using a camera and a line laser, as shown in FIG. 1. For this operation, an optical filter is attached to the camera to eliminate external noise. However, there is a problem in that, since the thickness of a laser pattern varies according to distance, the range of distance detection is narrow. Further, when the reflected pattern of the structured light appears on the camera, or when noise caused by a surrounding environment (for example, natural light) occurs, the function of the structured-light distance sensor can be impaired.

As an image processing method in a system using structured light, a method of binarizing an input image and utilizing the histogram of the binarized image is well known. For example, a device using the above method (for example, a vehicle) is constructed so that a laser and a camera are mounted on a front bumper thereof, and it radiates laser light onto an object and receives an image reflected from the object, as shown in FIG. 2. Further, the number of pixels having brightness above a certain level is indicated by the histogram of FIG. 3; they are counted so that a corner of the object can be recognized. However, this technology is problematic in that, since it can be applied only to the case where a detection target is simple, and only to an object which can be easily tracked after first being detected, it is difficult to apply the technology to household robots.

BRIEF SUMMARY

An aspect of the present invention provides a method and apparatus that efficiently eliminate noise from a line pattern on the image generated by structured light.

An aspect of the present invention provides a method and system that eliminate line pattern noise reflected from the image by a mirror effect.

In accordance with one aspect of the present invention, there is provided an apparatus for processing a line pattern, the apparatus including a light source module for radiating predetermined light and a camera module for capturing an image, onto which the light is radiated, the apparatus processing a line pattern included in the captured image, including: a kernel learning unit for determining a kernel shape and an optimal threshold value with respect to each vertical interval of the image using a simple line pattern formed at a predetermined location; a convolution application unit for applying convolution to a captured actual test image using the determined kernel shape and optimal threshold value; and a region selection unit for scanning each pixel column included in the image, to which the convolution is applied, in a vertical direction, and setting pixel values of pixel groups other than a selected pixel group to 0 when a plurality of pixel groups having pixel values other than 0 exists.

In accordance with another aspect of the present invention, there is provided a method of processing a line pattern, the method capturing an image, onto which predetermined light is radiated, and processing a line pattern included in the captured image, including: determining a kernel shape and an optimal threshold value with respect to each vertical interval of the image using a simple line pattern formed at a predetermined location; applying convolution to a captured actual test image using the determined kernel shape and optimal threshold value; and scanning each pixel column included in the image, to which the convolution is applied, in a vertical direction, and setting pixel values of pixel groups other than a selected pixel group to 0 when a plurality of pixel groups having pixel values other than 0 exists.

In accordance with another aspect of the present invention, there is provided a computer-readable storage medium encoded with processing instructions for causing a processor to execute the aforementioned method.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIGS. 16A to 16G are views showing binarized images generated at respective distances, and convolution-applied images obtained using several threshold values (Th.);

DETAILED DESCRIPTION OF EMBODIMENTS

Figure 1:
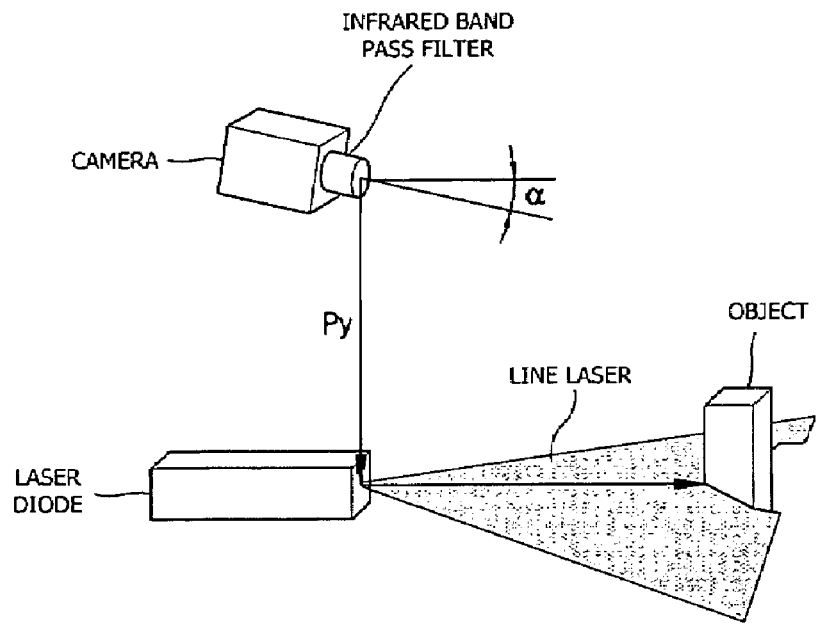
FIG. 1 is a diagram showing the basic concept of a structured-light distance sensor.
Figure 2:
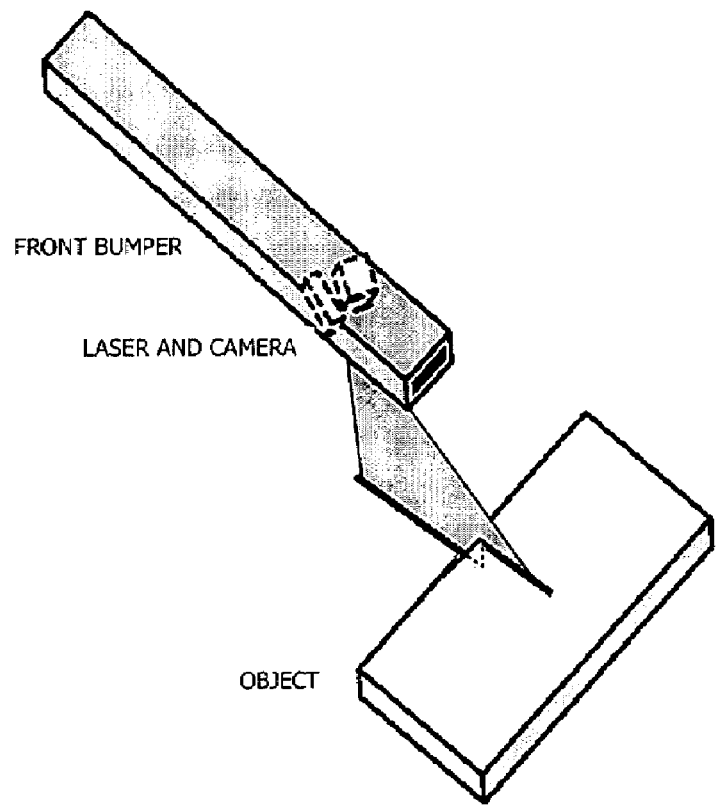
FIG. 2 is a diagram showing the basic concept of a conventional method that uses a structured-light distance sensor.
Figure 3:
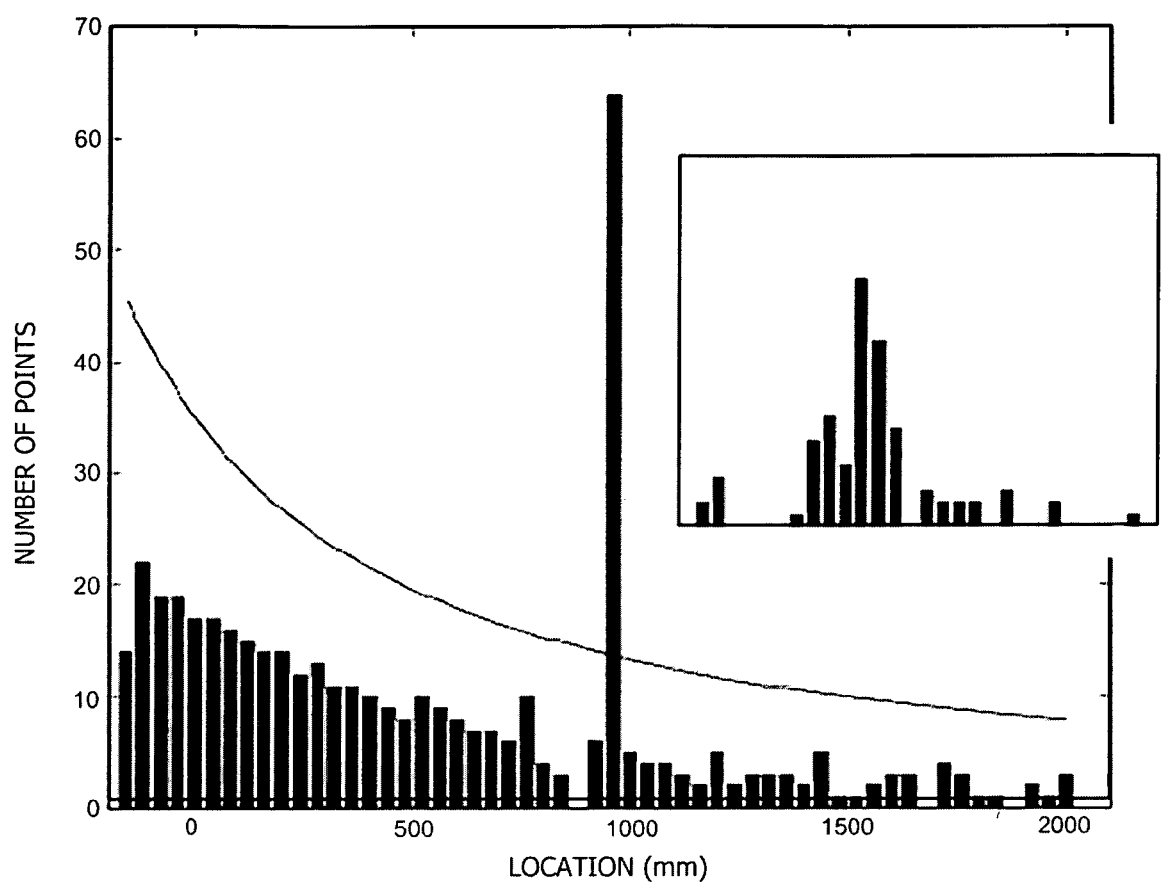
FIG. 3 is a graph showing a histogram obtained by the method of FIG. 2.

Reference will now be made in detail to embodiments of the present invention, examples of which are illustrated in the accompanying drawings, wherein like reference numerals refer to the like elements throughout. The embodiments are described below in order to explain the present invention by referring to the figures.

As described above, in order to implement Simultaneous Localization and Map Building (SLAM) using a structured light distance sensor, it is very important to precisely eliminate noise when capturing images. Therefore, various embodiments of the present invention propose technology for efficiently eliminating all noise from an image generated by the radiation of structured light; that is, technology for processing a line pattern.

A primary goal of such line pattern processing technology is to efficiently eliminate noise included in an image, which is the reflection of radiated laser light off an object, in addition to a pattern formed by actual laser light. This noise may cause errors in subsequent applications, such as distance measurement.

To achieve this goal, embodiments of the present invention are constructed to divide a captured image into a predetermined number of vertical intervals, and apply different line pattern processing methods to respective vertical intervals, in consideration of the fact that the captured image has different distances along a vertical direction, and thus, a laser pattern also has different thicknesses. Further, a region selection procedure is also performed to eliminate noise caused by a mirror effect.

Figure 4:
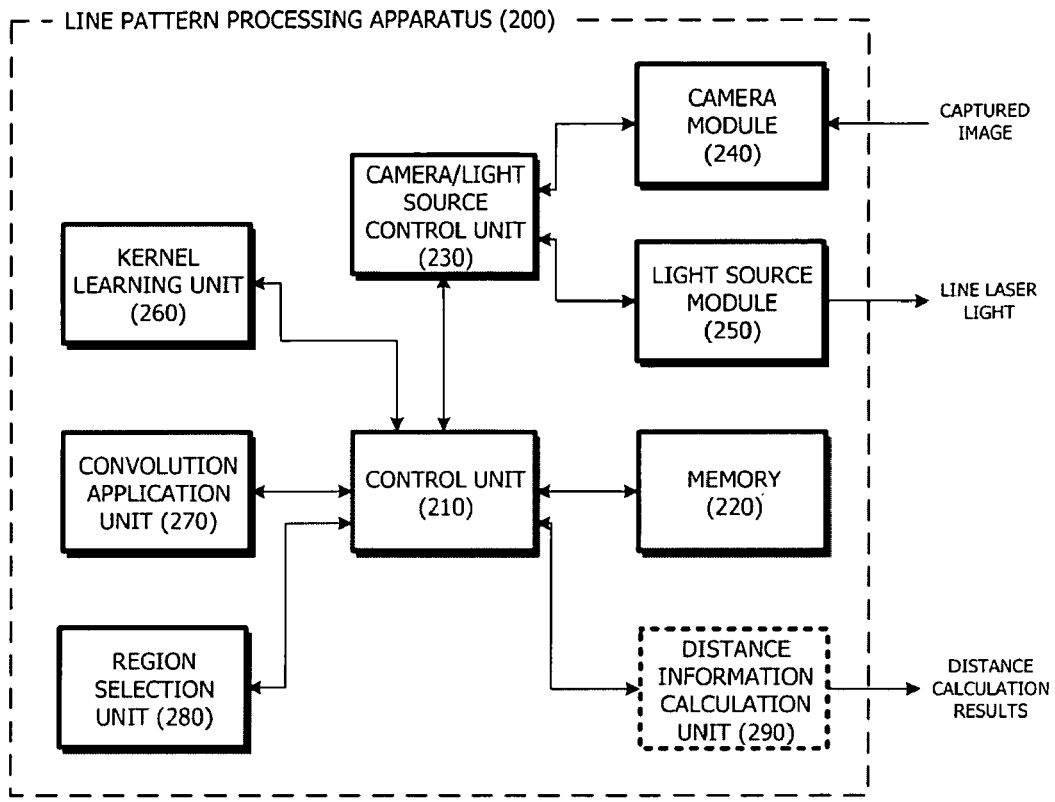
FIG. 4 is a block diagram showing the construction of an apparatus for processing a line pattern according to an embodiment of the present invention.

An apparatus 200 for processing a line pattern according to an embodiment of the present invention is shown in FIG. 4. The line pattern processing apparatus 200 includes a control unit 210, memory 220, a camera/light source control unit 230, a camera module 240, a light source module 250, a kernel learning unit 260, a convolution application unit 270, and a region selection unit 280. Further, the line pattern processing apparatus 200 may include a distance information calculation unit 290 to calculate distance information using a line-pattern-processed image.

The control unit 210 functions to control process interrupts and other components in the line pattern processing apparatus 200. The control unit 210 may be implemented as a Central Processing Unit (CPU), or a microprocessor The memory 220 temporarily stores various variables required for the operation of the line pattern processing apparatus 200, and it also stores an image generated by the result of the line pattern processing.

The camera/light source control unit 230 controls the operation of the camera module 240 and the light source module 250. The camera/light source control unit 230 operates the camera module 240 after operating the light source module 250, in order to receive a line pattern.

The light source module 250 radiates line laser light under the control of the camera/light source control unit 230. The line laser light is spread in a horizontal direction, as shown in FIG. 1.

The camera module 240 captures an image of an object, onto which the line laser light is radiated, under the control of the camera/light source control unit 230. In this case, a band pass filter is installed in the camera module 240 in order to receive only light in a predetermined frequency band. Therefore, the camera module 240 receives only light having a frequency close to the frequency of the laser light. However, even though such a band pass filter is provided, various types of light (that is, noise) having frequencies close to the frequency of the laser light may still exist. In particular, natural light has a wide frequency band, and thus, there is a high probability that natural light (i.e., noise) will be included in the image captured by the camera module 240.

The kernel learning unit 260 determines a kernel shape and an optimal threshold value with respect to each vertical interval of the image, using an input image including a line laser pattern formed at a predetermined location.

Figure 5:
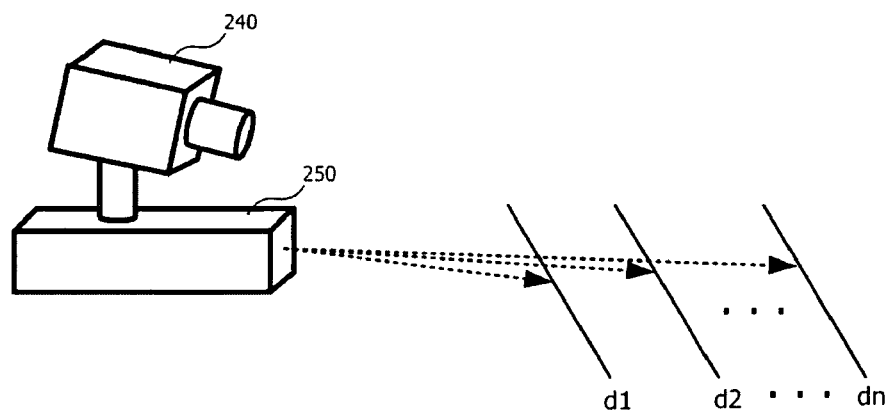
FIG. 5 is a view showing an example of a kernel learning environment.

For this operation, the kernel learning unit 260 induces the light source module 250 to radiate a line laser pattern onto a predetermined location, and it causes the camera module 240 to capture the image including the laser pattern. Preferably, such a line laser pattern, which is used for learning, (hereinafter referred to as a "simple line pattern") is radiated when no obstacle exists. As shown in FIG. 5, the light source module 250 radiates the line laser pattern onto a predetermined location, and the camera module 240 captures the image including the laser pattern. This process is repeated for each predetermined location.

Such a kernel learning procedure can be divided into the operations of radiating line laser light onto a predetermined location and capturing an image, selecting a kernel shape at a current location, and calculating an optimal threshold value at the current location. The kernel learning procedure will be described in detail with reference to FIG. 13.

Figure 6:
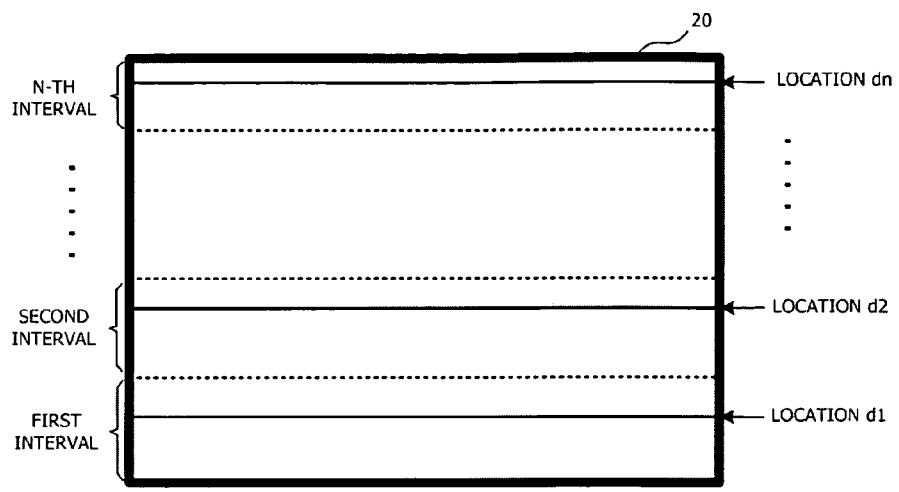
FIG. 6 is a view showing the relationship between the vertical interval of an image and the distance at which laser light is radiated at the time of learning.

If a kernel shape and an optimal threshold value are determined with respect to each location through the kernel learning procedure, the kernel shape and the optimal threshold value are used as a kernel shape and an optimal threshold value in an interval, which the corresponding location can represent with respect to an input image 20, as shown in FIG. 6. For example, it is assumed that predetermined locations are classified into three locations; a first location is placed at a distance of 40 cm, a second location is placed at a distance of 80 cm, and a third location is placed at a distance of 120 cm. The 0 to 60 cm interval can use a kernel shape and an optimal threshold value that are determined at the first location; the 60 to 100 cm interval can use the kernel shape and an optimal threshold value that are determined at the second location; and the interval above 100 cm can use the kernel shape and the optimal threshold value that are determined at the third location. Further, the image captured by the camera module 240 can be divided into vertical intervals, as shown in FIG. 6.

Figure 7:
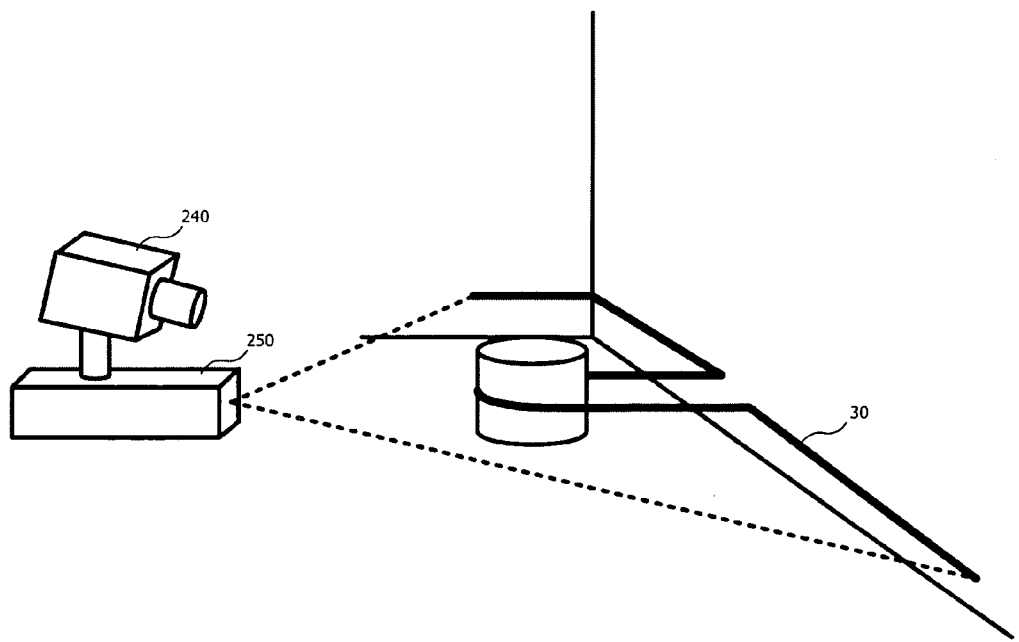
FIG. 7 is a view showing an example of the generation of a line pattern using radiated line laser light.
Figures 8, 9:
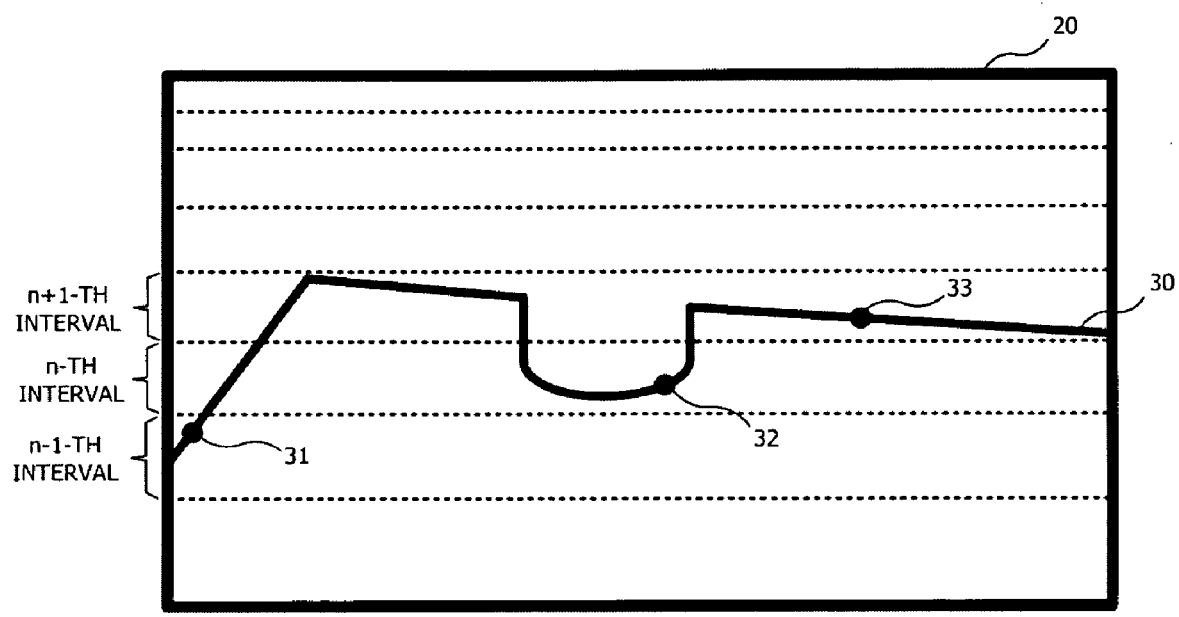
FIG. 8 is a view showing an image of the line pattern of FIG. 7.
FIG. 9 is a view showing a convolution kernel according to an embodiment of the present invention.

The convolution application unit 270 applies convolution to an image (hereinafter referred to as a "test image"), captured after line laser light has been radiated in an environment where an actual obstacle exists, as shown in FIG. 7, using the kernel shapes and the optimal threshold values determined by the kernel learning unit 260. When the convolution is applied, different kernel shapes and optimal threshold values are applied to respective intervals. FIG. 8 illustrates the image captured in FIG. 7, in which pixels 31, 32 and 33, forming a line laser pattern 30 of FIG. 7, may belong to different intervals. Therefore, different kernel shapes and optimal threshold values are applied to the pixels 31, 32 and 33 depending on the intervals to which the pixels belong.

The kernel used in the present embodiment (convolution kernel) can be defined as shown in FIG. 9. In this case, $kernel_{m,n}$ is a convolution kernel allowing m to n pixels to pass therethrough in a vertical direction, where m and n are a minimum line thickness (minimum kernel size) and a maximum line thickness (maximum kernel size), respectively. If such a kernel is applied to a vertical direction, only pixels having thickness falling within a range of m to n pass through the kernel.

For example, when m is 2 and n is 6, the kernel is expressed by the following Equation [1]. Such a kernel serves to allow 2 to 6 adjacent pixels to pass therethrough.

$$kernel_{2,6} = [-2\ 0\ 0\ 1\ 1\ 0\ 0\ -2] \quad [1]$$

Of course, in order to determine whether pixels pass through a kernel, a threshold value, which is a reference, is required. If a threshold value is m×255 (a single pixel is assumed to be expressed by 8 bits), two consecutive white pixels or six consecutive white pixels can pass through the kernel in the case of a binary image.

However, since the test image is not a binary image, but can be expressed by a value ranging from 0 to 255 (in the case of 8 bits), two to six consecutive pixels do not necessarily pass through the kernel. Further, m×255 is not actually used as the threshold value, but an optimal threshold value determined by the kernel learning unit 260 (less than m×255) is used.

Figure 10:
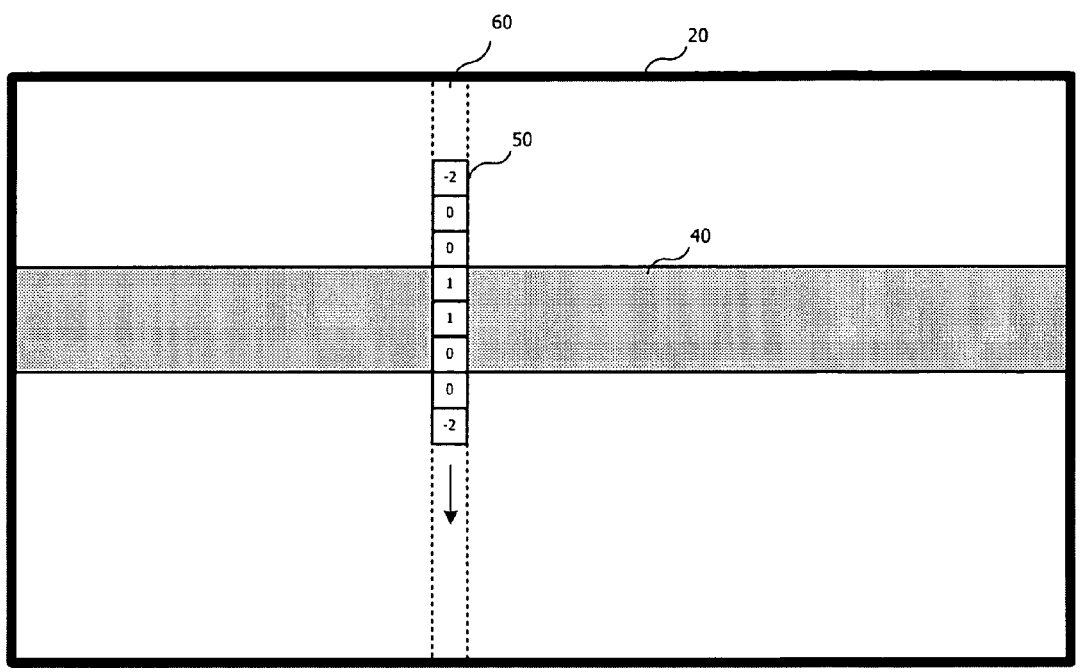
FIG. 10 is a view showing the concept of applying a convolution kernel.

Such convolution is shown in FIG. 10. A convolution-applied value is calculated while the kernel is moved in a vertical direction with respect to a single pixel column, and whether the calculated value exceeds a threshold value is determined. If the calculated value exceeds the threshold value, the corresponding pixel is allowed to pass through the kernel. If a convolution-applied value (C) is calculated at the location shown in FIG. 10 using a kernel 50, equation 2 is obtained (below). In this case, it is assumed that all the pixel values of a captured line laser pattern 40 are P, and the pixel values of the remaining region are 0.

$$C = -2 \times 0 + 0 \times 0 + 1 \times P + 1 \times P + 0 \times P + 0 \times 0 + -2 \times 0 = 2P \quad [2]$$

Further, the convolution-applied value calculated in this way is compared to the optimal threshold value of a corresponding interval, and only pixels exceeding the optimal threshold value are allowed to pass through the kernel. In the image generated as a result of the convolution application (hereinafter referred to as a "convolution-applied image"), pixels that pass through the convolution kernel are expressed by 255 (expressed in 8 bits), and the remaining pixels that do not pass through the convolution kernel are expressed by 0.

After such a convolution application procedure has been completely performed with respect to a specific pixel column 60, the same procedure is performed with respect to a subsequent pixel column. After the above procedure is applied to an entire image, the process terminates. The convolution application procedure is performed using different kernel shapes and optimal threshold values with respect to respective vertical intervals through the kernel learning unit 260, thereby filtering out noise pixels deviating from a range (from m to n) of the kernel in each interval.

Returning to FIG. 4, the region selection unit 280 scans an image, to which convolution is to be applied by the convolution application unit 270, in a vertical direction, determines whether two or more discontinuous pixels having pixel values other than 0 exist in a single pixel column, and selects continuous pixels having the largest pixel thickness, among the discontinuous pixels. Through this procedure, a final line-pattern-processed binary image (hereinafter referred to as an "output binary image") is generated. A region selection procedure performed by the region selection unit 280 will be described in detail with reference to FIG. 17. When the reflection of a laser pattern occurs, a plurality of discontinuous pixel groups (or regions) may exist even in a single pixel column; the region selection procedure is a procedure for eliminating a pattern generated due to reflection from the discontinuous pixel groups (or regions). Only a region having the largest thickness is selected from the pixel groups, on the assumption that a reflected pattern has a thickness less than an original pattern.

The line pattern processing apparatus 200 according to the present embodiment may further include the distance information calculation unit 290 for building a two-dimensional map using the output binary image.

The distance information calculation unit 290 calculates the distance to an obstacle using the output binary image generated by the line pattern processing apparatus 200 of the present invention, and builds a map based on the calculation results.

Figure 11:
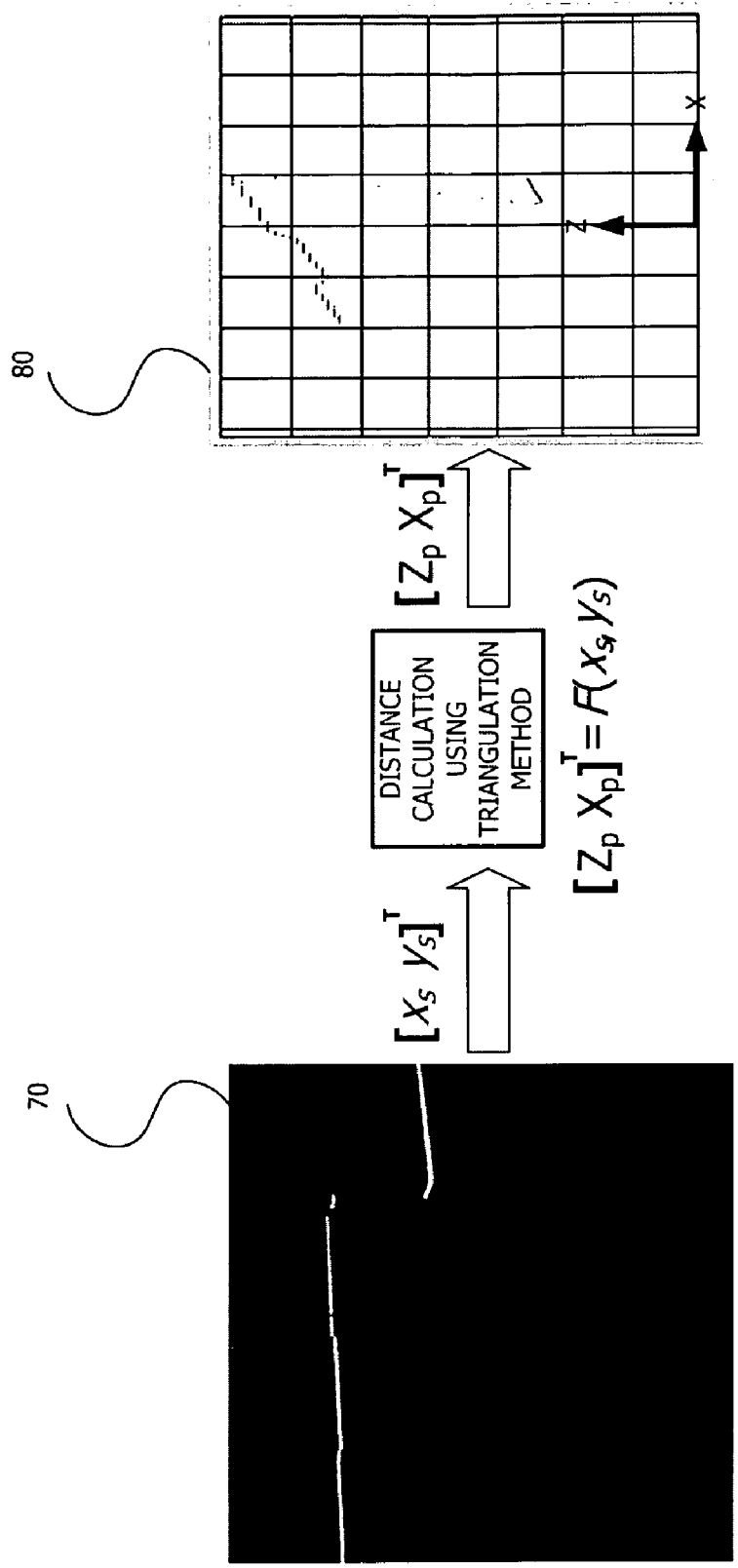
FIG. 11 is a view showing the concept of building a map using a processed line pattern.

In this case, information about each point existing in the output binary image is converted into coordinate values on a plane by distance measurement using a triangulation method, as shown in FIG. 11, and thus, distance data can be obtained as a result of the conversion. In this case, the plane is a plane on which the light source module 250 and the obstacle of FIG. 7 are viewed from above, which is shown in FIG. 11. If arbitrary coordinates in an output binary image 70 are $[x_s, y_s]^T$ and a conversion function using a triangulation method is F, plane coordinates 80 can be indicated by $[Z_p, X_p]^T = F(x_s, y_s)$. In this case, the Z direction denotes the direction that the laser light is emitted. In this case, $F(x_s, y_s)$ can be defined by the equation:

$$F(x_S, y_S) = \begin{bmatrix} Z_P \\ X_P \end{bmatrix} = \begin{bmatrix} PY \cdot \dfrac{-\sin\alpha \cdot (ys - yo) \cdot a + \cos\alpha}{\sin\alpha + \cos\alpha \cdot (ys - yo) \cdot a} \\ \dfrac{PY \cdot (xs - xo) \cdot b}{\sin\alpha + \cos\alpha \cdot (ys - yo) \cdot a} \end{bmatrix}, \quad [3]$$

where xo and yo are coordinates of the center position of an image (pixel units), PY is the distance between the camera and the laser module 250 for emitting laser light, α is the inclination angle of the camera, and a and b are constants related to a scale indicating the ratio of an image pixel unit to a distance in space. In this case, function F is a two-dimensional vector, to which addition, subtraction and absolute value calculation, used for a typical two-dimensional vector, are applied.

The above-described components of FIG. 4 are software or hardware components, such as a Field Programmable Gate Array (FPGA) or an Application Specific Integrated Circuit (ASIC). Further, the components may advantageously be configured to reside on an addressable storage medium and be configured to execute on one or more processors. The functionality provided for in the components may be further separated into additional components or combined into a single component for performing a specific function.

Figure 12:
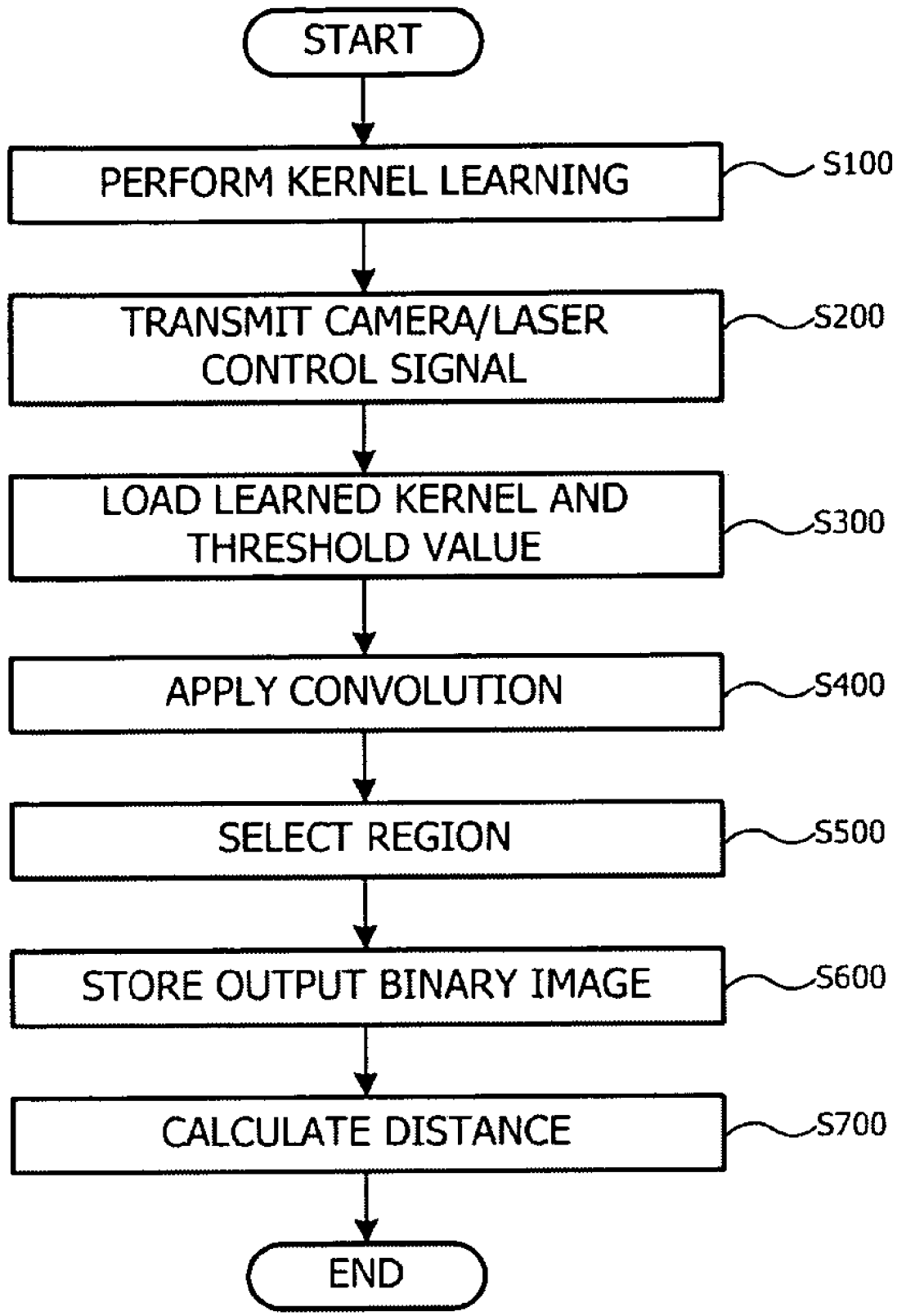
FIG. 12 is a flowchart of a method of processing a line pattern according to an embodiment of the present invention.

FIG. 12 is a flowchart of a method of processing a line pattern according to an embodiment of the present invention. This method is explained hereafter with concurrent reference to FIG. 4 for ease of explanation only. Thus, it is to be understood that the method may be performed by apparatuses having configurations other than that shown in FIG. 4.

First, the kernel learning unit 260 performs the kernel learning procedure for determining a kernel shape and an optimal threshold value with respect to each vertical interval of an input image, using the input image including a line laser pattern formed at a predetermined location in operation S100. The kernel learning procedure will be described in detail with reference to FIG. 13. After kernel learning has been completed, an optimal kernel shape and an optimal threshold value are determined with respect to each vertical interval of the image and are stored in the memory 220. Thereafter, a procedure of receiving an actual test image and processing a line pattern included in the input image using the actual test image and stored information can be performed.

The camera/light source control unit 230 transmits a camera control signal and a light source control signal, thus inducing the light source module 250 to radiate predetermined light (laser light) and causing the camera module 240 to capture an image of the object onto which the laser light is radiated in operation S200.

Further, the control unit 210 loads the kernel shape and optimal threshold value for each vertical interval, which are stored in the memory 220, in operation S300.

The convolution application unit 270 applies convolution to the image captured by the camera module 240 using the loaded kernel shape and optimal threshold value controlled by the control unit 210 in operation S400. During the operation of applying convolution, different kernel shapes and optimal threshold values are applied to respective vertical intervals, to which target pixels belong, depending on the vertical intervals.

The region selection unit 280 scans the image, to which the convolution is to be applied by the convolution application unit 270, in a vertical direction, detects a set of consecutive pixels having values other than 0 (hereinafter referred to as a "pixel group") from a single pixel column, and selects consecutive pixels having the largest thickness (that is, a region) from the pixel group in operation S500, thus generating a final output binary image.

The control unit 210 stores the output binary image generated by the region selection unit 280 in the memory 220 in operation S600. The distance information calculation unit 290 calculates the distance to the obstacle using the stored output binary image, and builds a map based on the calculation results in operation S700.

Figure 13:
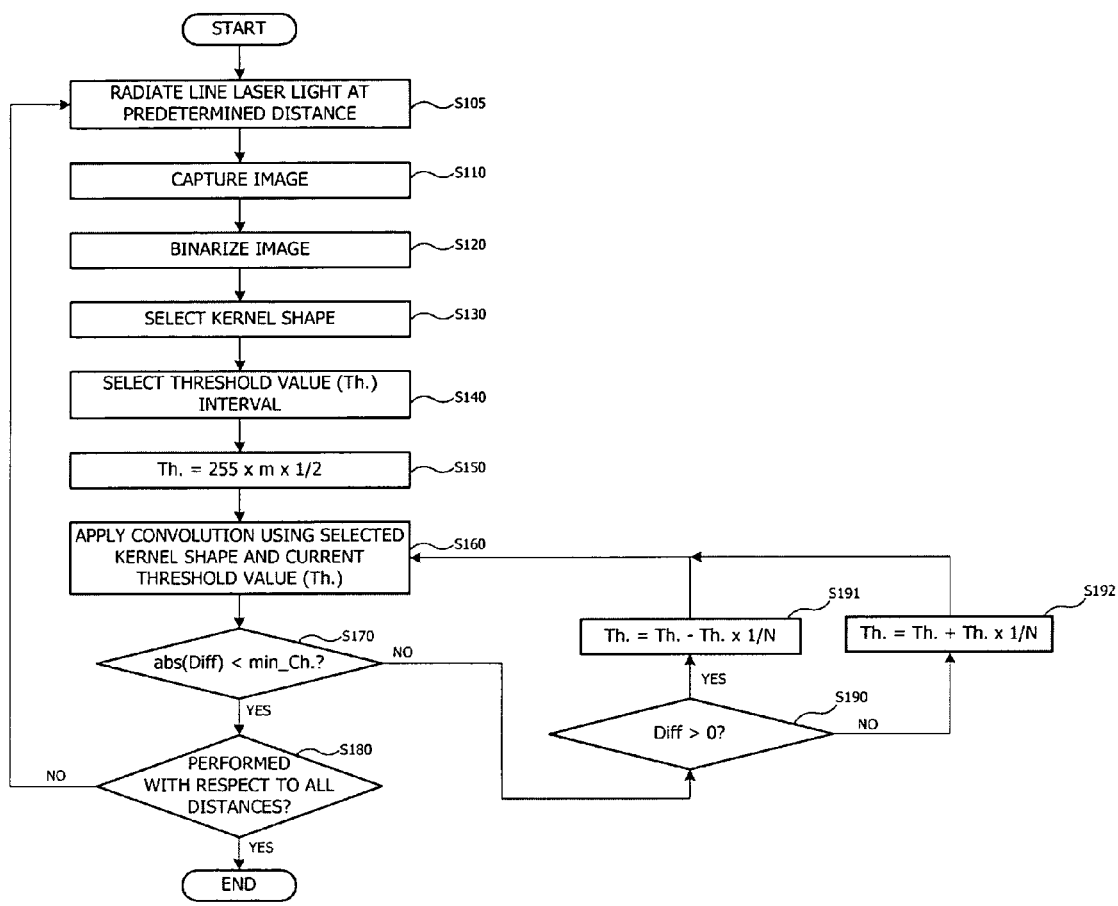
FIG. 13 is a flowchart showing step S100 of FIG. 12 in detail.

FIG. 13 is a flowchart showing the kernel learning operation S100 of FIG. 12 in detail.

First, the light source module 250 radiates line laser light at a predetermined distance in operation S105, and the camera module 240 captures an image of the object onto which the laser light is radiated in operation S110.

Thereafter, the kernel learning unit 260 binarizes the captured image in operation S120. Binarization is a procedure of converting each pixel into a white pixel (pixel value 255 in the case of 8 bits) when the pixel value thereof exceeds a predetermined threshold value, and converting each pixel into a black pixel (pixel value 0) when the pixel value thereof does not exceed the threshold value.

Figures 14, 15:
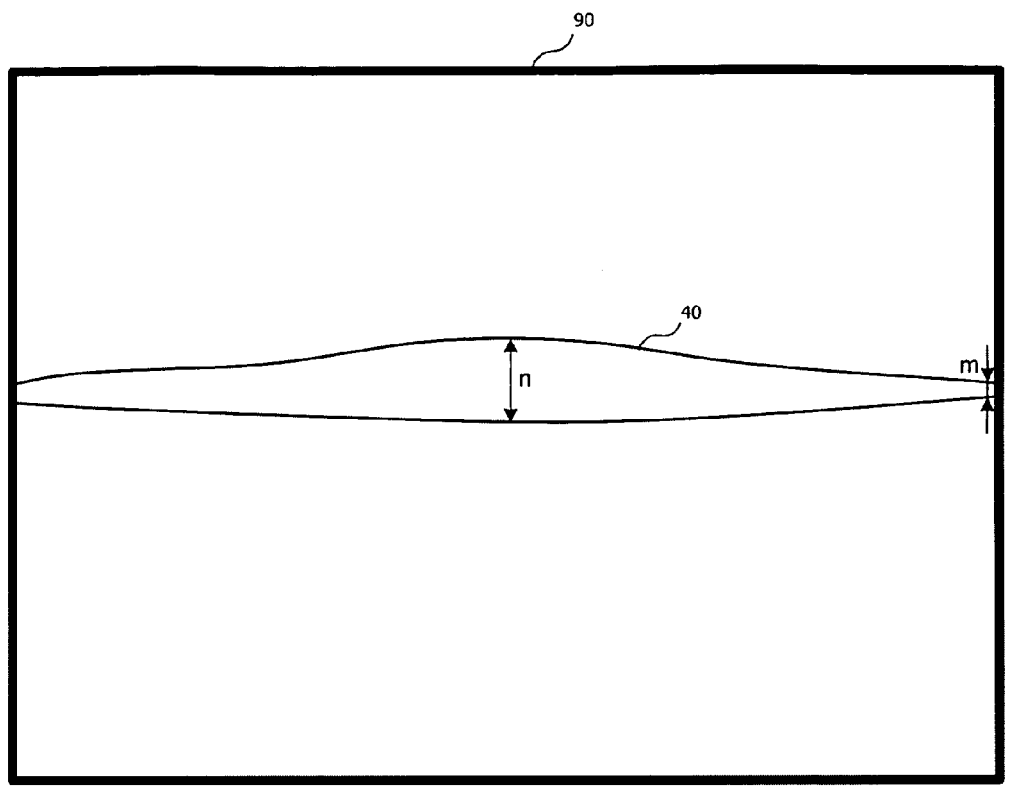
FIG. 14 is a view showing a method of selecting a kernel shape.
FIG. 15 is a view showing a convolution kernel according to another embodiment of the present invention.

The kernel learning unit 260 selects a kernel shape depending on the line pattern of the binarized image (operation S130). The kernel shape is selected by determining values m and n in the kernel of FIG. 9 according to the present embodiment. As shown in FIG. 14, if it is assumed that the maximum thickness of the line pattern 40 included in a binarized image 90 is n, and the minimum thickness of the line pattern 40 is m, a kernel shape having a minimum size of m and a maximum size of n is determined, as shown in FIG. 9. At the time of learning, the kernel of FIG. 9 may be used, but the modified kernel of FIG. 15 can be used to improve robustness against noise. The modified kernel of FIG. 15 has the effect of somewhat extending a dark portion (−m/2); in other words, the probability of noise being allowed to pass through the kernel is relatively low.

Next, the kernel learning unit 260 selects a threshold value interval (Th. Interval) using the minimum kernel size m in operation S140. Such a threshold value interval can be designated within a range from 0 to 255×m.

The kernel learning unit 260 sets an initial threshold value to a value corresponding to ½ of the threshold value interval, that is, 255×m×½, in operation S150, and allows the convolution application unit 270 to apply convolution to the image existing before binarization, that is, the image input to the camera module 240, using the selected kernel shape and a current threshold value (Th.) in operation S160.

After the application of convolution, the kernel learning unit 260 determines whether abs (Diff) is less than min_Ch in operation S170. If abs (Diff) is less than min_Ch in operation S170, the process proceeds to operation S180; otherwise, the process proceeds to operation S190 because an optimal threshold value has not been obtained yet.

In this case, function abs ( . . . ) is a function for obtaining an absolute value, and Diff is the sum of results obtained by subtracting the image, to which convolution has been applied in operation S160, from the binarized image; that is, the sum of differences between the corresponding pixel values of both images. Further, min_Ch is an allowable threshold value of Diff, and can be selected as another suitable value according to a user. However, there is a disadvantage in that, if min_Ch is too high, it is difficult to obtain an optimal threshold value, whereas if min_Ch is too low, a loop (a procedure ranging over operations S170, S190 and S160 of FIG. 13) must be repeated a large number of times. Min_Ch can be selected to be 255×5 (in the case of an 8 bit image). Of course, unlike the present embodiment, a threshold value at which abs(Diff) is minimized can be repeatedly detected without using min_Ch.

In operation S190, the kernel learning unit 260 determines whether Diff is greater than 0 in operation S190. If Diff is greater than 0, the threshold value (Th.) is decreased by a predetermined level in operation S191, otherwise the threshold value (Th.) is increased by the level in operation S192. That Diff is greater than 0 means that the convolution-applied image is darker than the binarized image. Therefore, the convolution-applied image is relatively brightened by decreasing the threshold value in operation S191. That Diff is less than 0 means that the convolution-applied image is brighter than the binarized image. Therefore, the convolution-applied image is relatively darkened by increasing the threshold value in operation S192.

In the present embodiment, the predetermined level required to change a threshold value (Th.) is a value obtained by dividing the initial threshold value by a predetermined number N.

After operations S191 and S192 have been performed, operations S160 and S170 are repeated. The procedure is repeated until the condition in operation S170 is satisfied.

If abs(Diff) is less than min_Ch (the case of "no" in operation S170), whether the above procedure is performed with respect to all distances is determined in operation S180. If the procedure is performed with respect to all distances, the process terminates, otherwise laser light is radiated another distance, and thus a procedure subsequent to operation S105 is repeated.

For ease of understanding the learning process of FIG. 13, description is made using detailed examples. It is assumed that distances the laser light is radiated are 40, 55, 70, 100, 220, 340 and 460 cm, and vertical pixel intervals corresponding to the distances in the image having a vertical size of 480 are intervals ranging from 0 to 59, 60 to 79, 80 to 109, 110 to 179, 180 to 249, 250 to 299, and 300 to 479, respectively, in the upward direction from below. In this case, binarized images generated at respective distances, and convolution-applied images obtained using several threshold values (Th.) are shown in FIGS. 16A to 16E.

FIG. 16A is a view showing a binarized image 90a obtained from an object a distance of 40 cm away, and convolution-applied images 95a obtained using several threshold values (Th.). In this case, a kernel having a minimum size of 2 and a maximum size of 15 is selected. In the convolution-applied images 95a, the minimum value of abs(Diff) is 2178, and a threshold value (Th.) of 200.39 is an optimal threshold value.

Figure 16B:
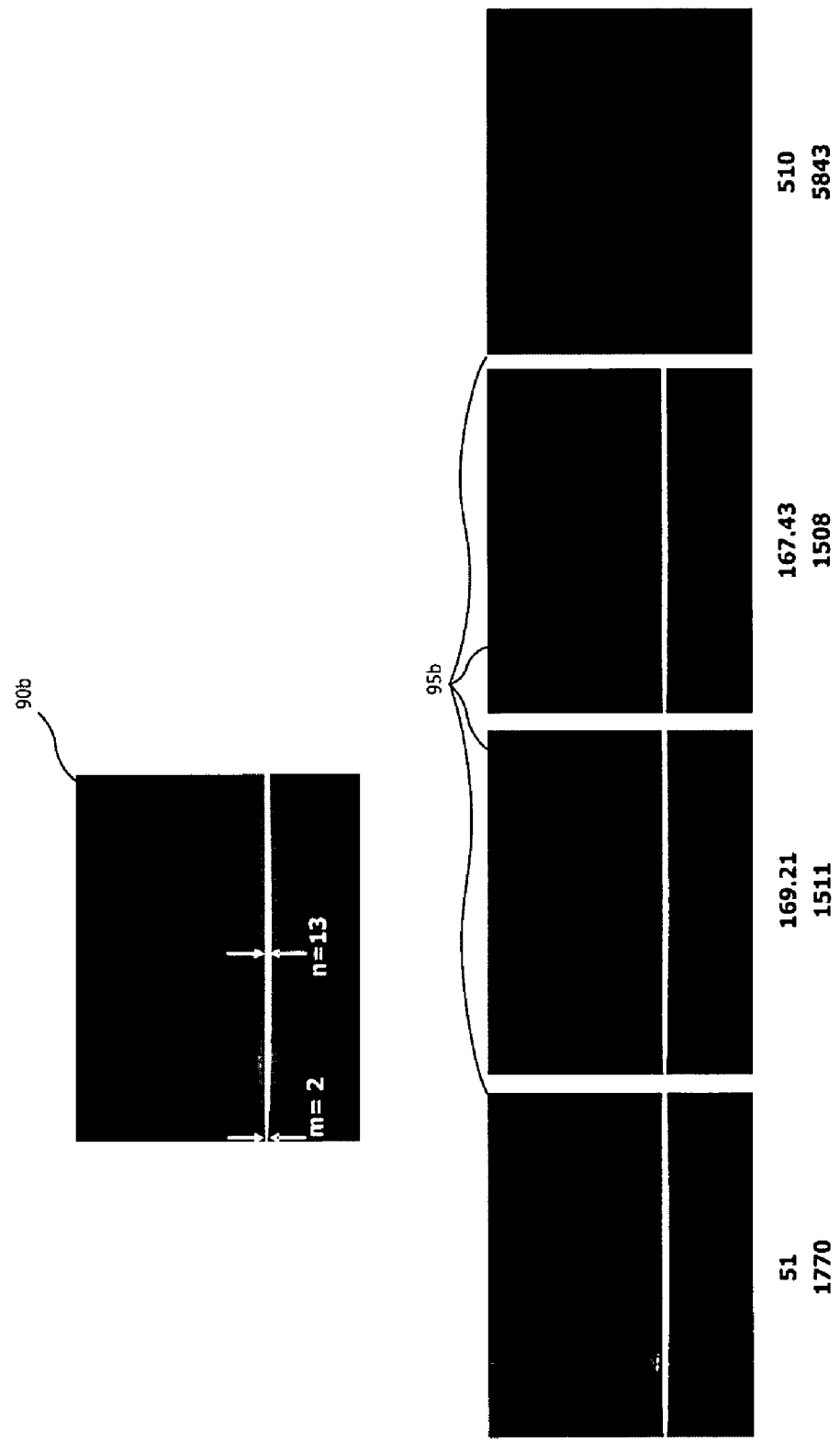

FIG. 16B is a view showing a binarized image 90b obtained from an object a distance of 55 cm away, and convolution-applied images 95b obtained using several threshold values (Th.). In this case, a kernel having a minimum size of 2 and a maximum size of 13 is selected. In the convolution-applied images 95b, the minimum value of abs(Diff) is 1508, and a threshold value (Th.) of 167.43 is an optimal threshold value.

Figure 16C:
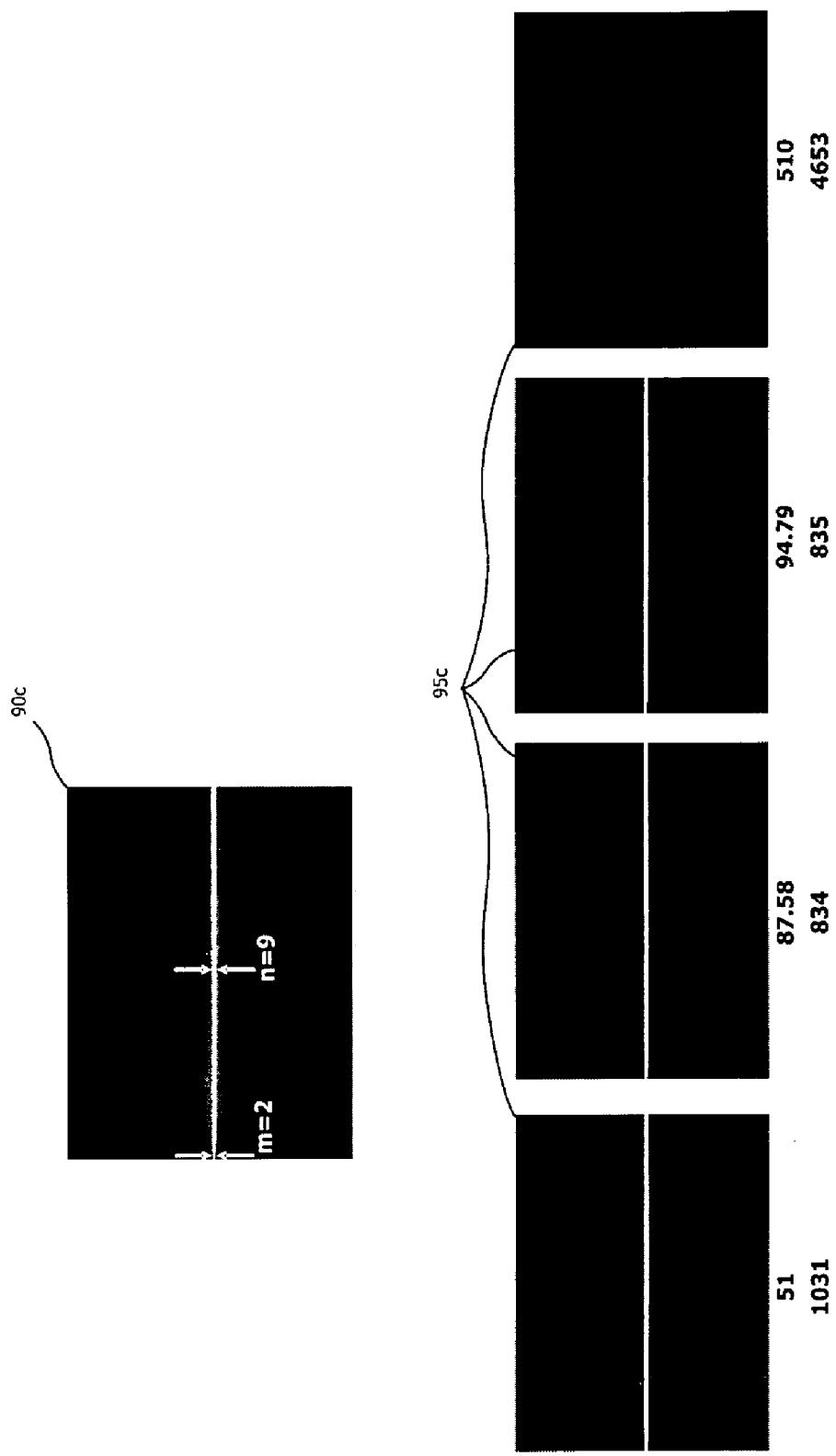

FIG. 16C is a view showing a binarized image 90c obtained from an object a distance of 70 cm away, and convolution-applied images 95c obtained using several threshold values (Th.). In this case, a kernel having a minimum size of 2 and a maximum size of 9 is selected. In the convolution-applied images 95c, the minimum value of abs(Diff) is 834, and a threshold value (Th.) of 87.58 is an optimal threshold value.

Figure 16D:
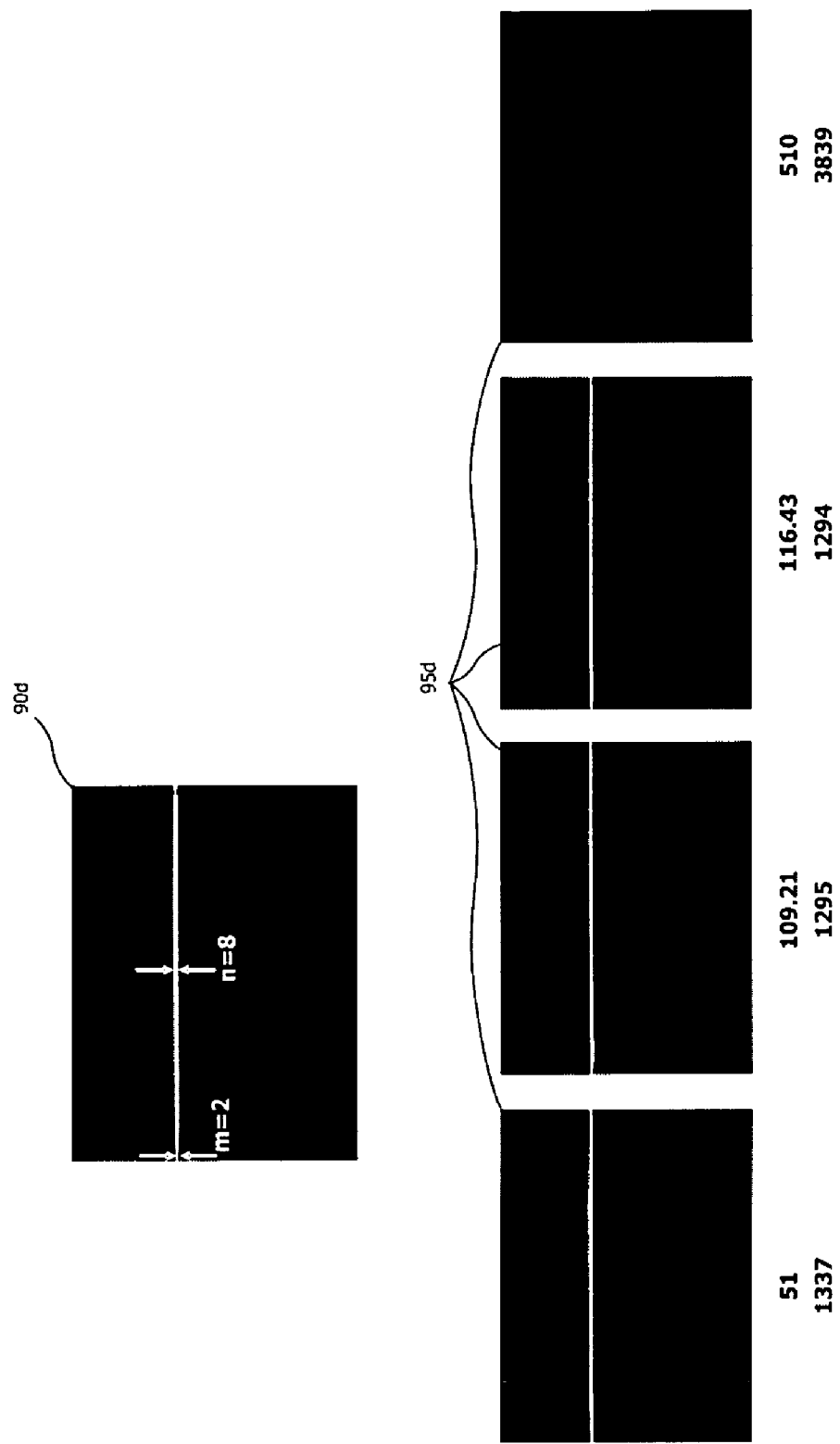

FIG. 16D is a view showing a binarized image 90d obtained from an object a distance of 100 cm away, and convolution-applied images 95d obtained using several threshold values (Th.). In this case, a kernel having a minimum size of 2 and a maximum size of 8 is selected. In the convolution-applied images 95d, the minimum value of abs (Diff) is 1294, and a threshold value (Th.) of 116.43 is an optimal threshold value.

FIG. 16E is a view showing a binarized image 90e obtained from an object a distance of 220 away, and convolution-applied images 95e obtained using several threshold values (Th.). In this case, a kernel having a minimum size of 2 and a maximum size of 7 is selected. In the convolution-applied images 95e, the minimum value of abs(Diff) is 590, and a threshold value (Th.) of 327.64 is an optimal threshold value.

Figure 16F:
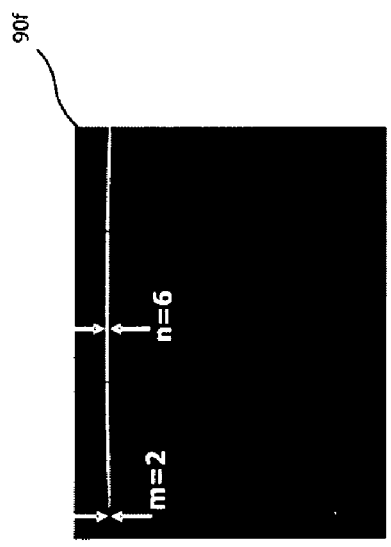
Figure 16F:
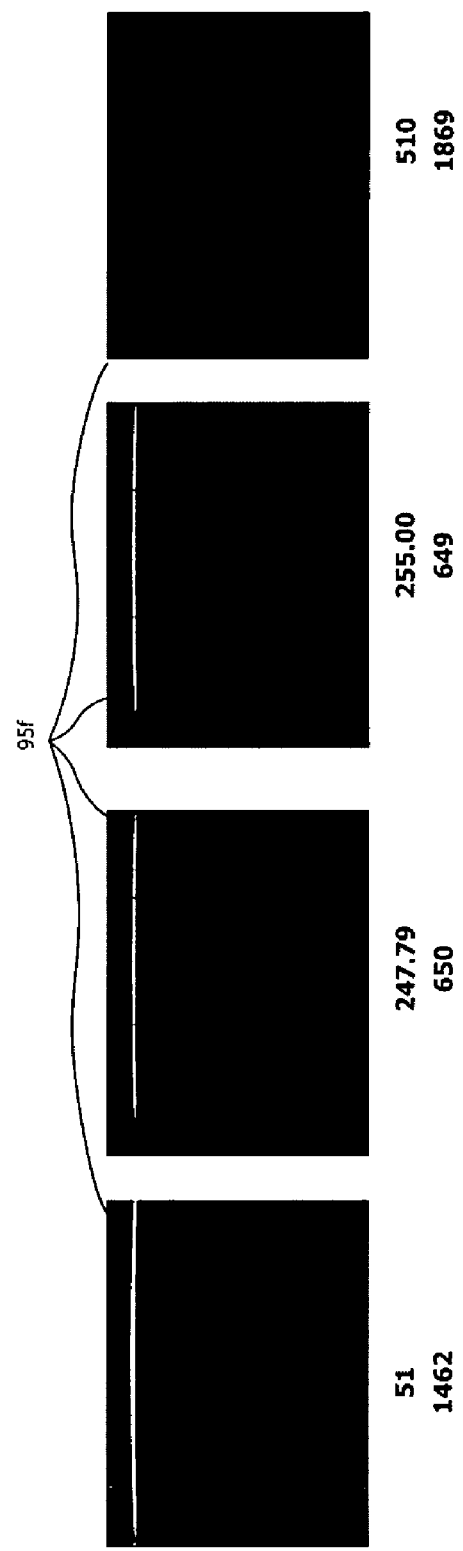

FIG. 16F is a view showing a binarized image 90f obtained from an object a distance of 340 cm away, and convolution-applied images 95f obtained using several threshold values (Th.). In this case, a kernel having a minimum size of 2 and a maximum size of 6 is selected. In the convolution-applied images 95f, the minimum value of abs(Diff) is 649, and a threshold value (Th.) of 255.00 is an optimal threshold value.

FIG. 16G is a view showing a binarized image 90g obtained from an object a distance of 460 away, and convolution-applied images 95g obtained using several threshold values (Th.). In this case, a kernel having a minimum size of 2 and a maximum size of 6 is selected. In the convolution-applied images 95g, the minimum value of abs(Diff) is 568, and a threshold value (Th.) of 182.36 is an optimal threshold value.

The kernel shapes and optimal threshold values selected in FIGS. 16A to 16G are shown in the following Table 1; they are selected with respect to respective vertical pixel intervals, and are stored in the memory 220.

TABLE 1

Kernel Shapes and Optimal Threshold Values

| Pixel range | Kernel shape | | |
|---|---|---|---|
| (downward) | M | N | Threshold |
| 0~59 | 2 | 6 | 182.36 |
| 60~79 | 2 | 6 | 255 |
| 80~109 | 2 | 7 | 327.64 |
| 110~179 | 2 | 8 | 116.43 |
| 180~249 | 2 | 9 | 87.58 |
| 250~299 | 2 | 13 | 167.43 |
| 300~479 | 2 | 15 | 200.39 |

Figure 17:
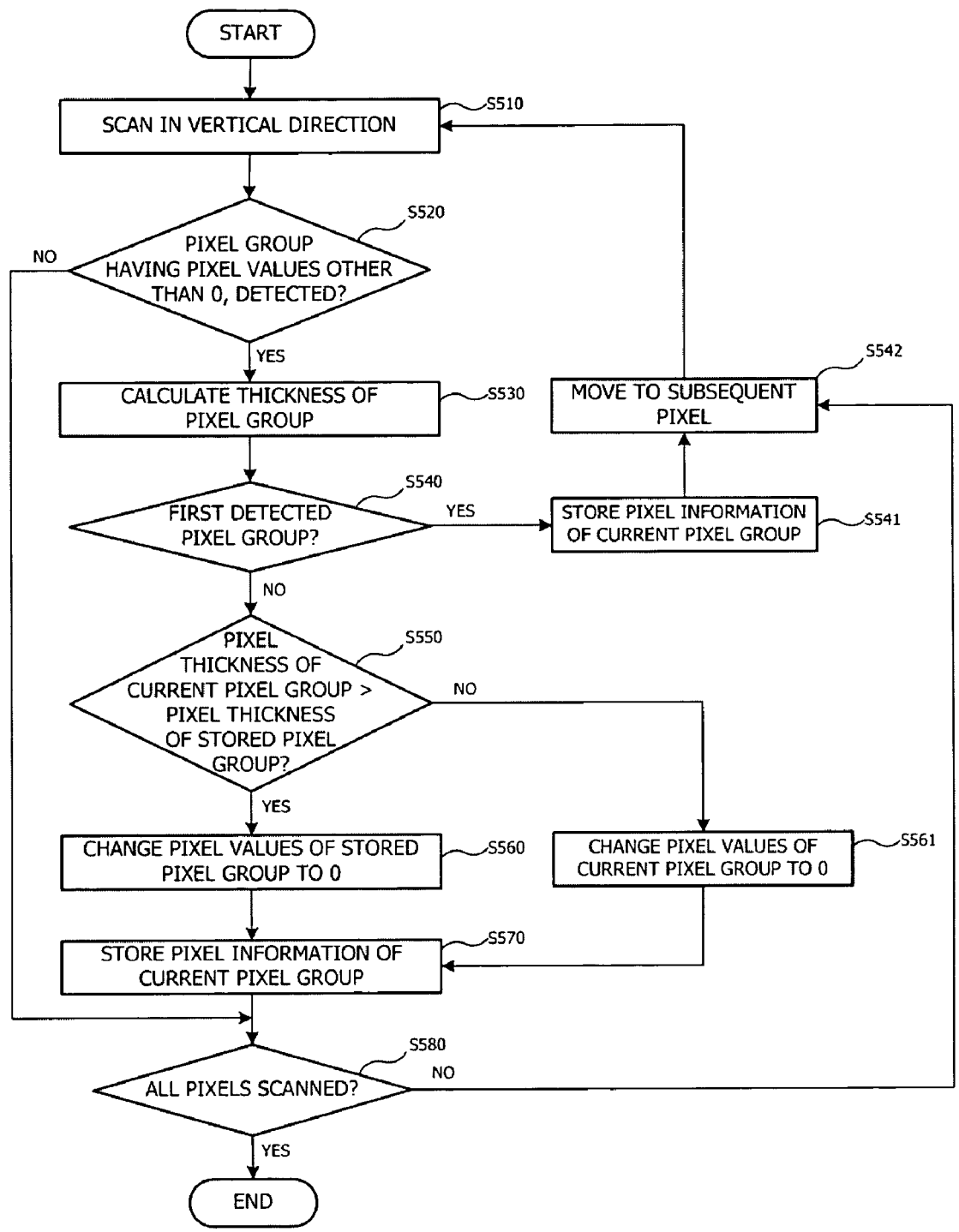
FIG. 17 is a flowchart showing operation S500 of FIG. 12 in detail.
Figure 18:
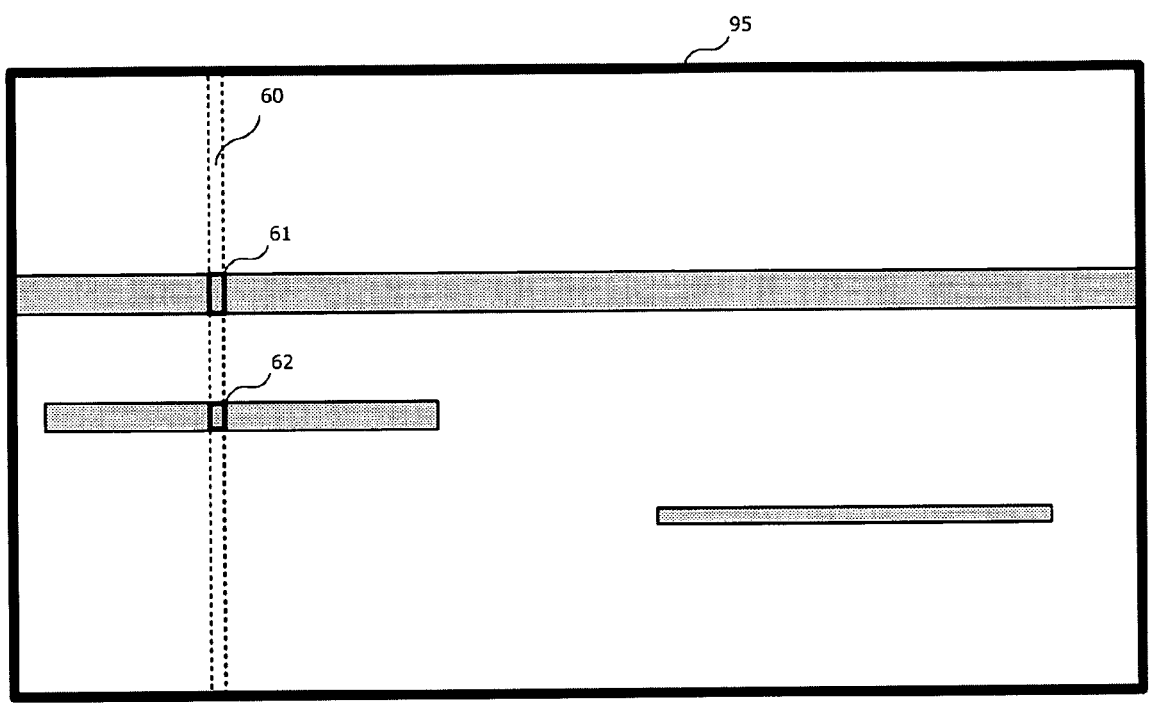
FIG. 18 illustrates a region selection procedure.

FIG. 17 is a flowchart showing the region selection operation S500 of FIG. 12 in detail. The region selection operation is a procedure for eliminating a laser pattern (a kind of noise) reflected due to a mirror effect. As shown in FIG. 18, if a certain pixel column 60 is vertically scanned and a plurality of pixel groups 61 and 62 is detected on the assumption that a convolution-applied image generated in operation S400 exists, there is a high probability that the pixel group 61, having a large thickness among the pixel groups, is an actual laser pattern, and a pixel group 62, having a small thickness, is a reflected laser pattern. The reason for this is that in an image captured after the light source module 250 horizontally radiates line laser light only a single laser pattern, that is, a single pixel group, must be detected in a vertical direction, in theory. Further, the convolution-applied image is a binary image having a value of 0 or 255 (in the case of an 8 bit image) depending on whether pixels pass through the kernel.

Referring to FIGS. 4 and 17, in order to perform region selection in operation S500, the region selection unit 280 scans a certain pixel column of an image 20 captured by the camera module 240 in a vertical direction in operation S510. Such pixel column scanning is performed with respect to a range from the leftmost pixel column to the rightmost pixel column.

If a pixel group having a pixel value other than 0 is detected during the scanning procedure ("yes" in operation S520), the region selection unit 280 calculates the thickness of consecutive pixels included in the pixel group in operation S530.

Further, if the pixel group is a first detected pixel group ("yes" in operation S540), the process proceeds to operation S550, while if the pixel group is not a first detected pixel group ("no" in operation S540), the process proceeds to operation S541.

In operation S541, the region selection unit 280 stores the pixel information of the current pixel group in the memory 220 in operation S541, moves down to a subsequent pixel in operation S542, and continues to scan the subsequent pixel in a vertical direction in operation S510. The pixel information includes information about the coordinates and thickness of the pixels included in the pixel group.

Meanwhile, in operation S550, the region selection unit 280 determines whether the pixel thickness of the current pixel group is greater than that of a previously stored pixel group in operation S550. If the pixel thickness is greater than that of the previously stored pixel group, all the pixel values of the previously stored pixel group are changed to 0 in operation S560. Then, the pixel information of the current pixel group is stored in operation S570, and the process proceeds to operation S580.

In operation S550, if the pixel thickness is not greater than that of the previously stored pixel group, all the pixel values of the current pixel group are changed to 0 in operation S561, the pixel information of the current pixel group is stored in operation S570, and the process proceeds to operation S580.

In operation S580, if scanning for all pixels of the corresponding pixel column has been completed by the region selection unit 280 ("yes" in operation S580), the process terminates; otherwise the region selection unit 280 moves to a subsequent pixel in operation S542.

The flowchart of FIG. 17 is performed with respect to a single pixel column, but the region selection procedure is performed with respect to all pixel columns forming an image by repeating the procedure of FIG. 17.

FIGS. 19A to 19E and FIGS. 20A to 20C are views showing the results of experiments of the present invention.

Figure 19A:
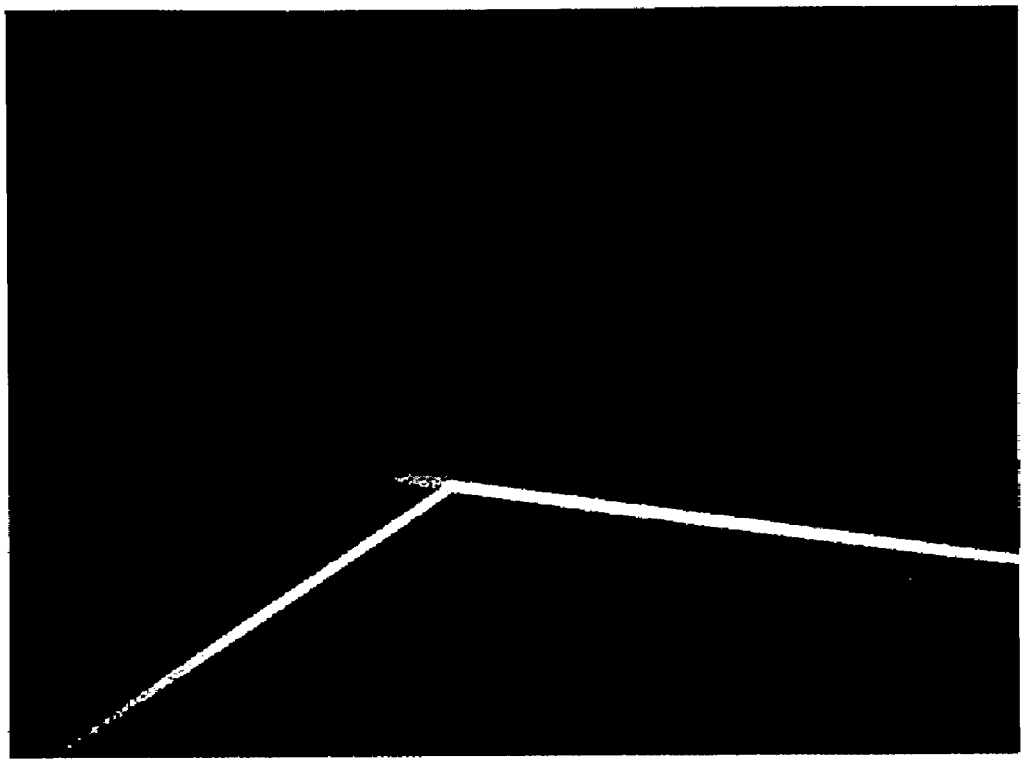
FIGS. 19A to 19E are views showing first experimental results obtained using the embodiment of the present invention and a comparison embodiment.
Figure 19B:
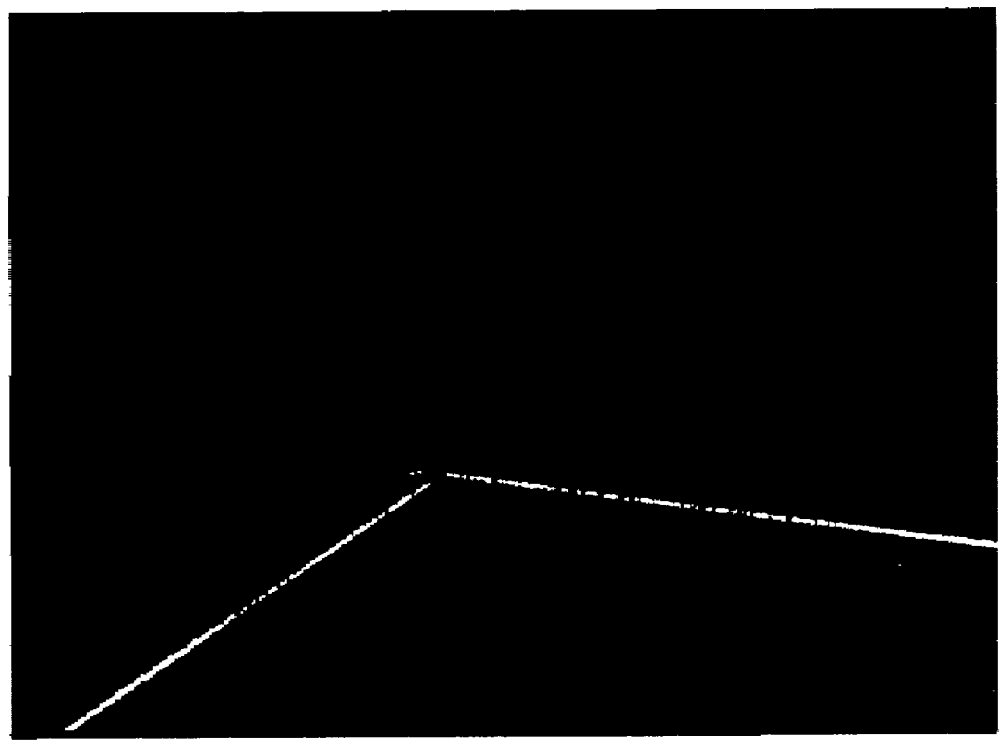
Figure 19C:
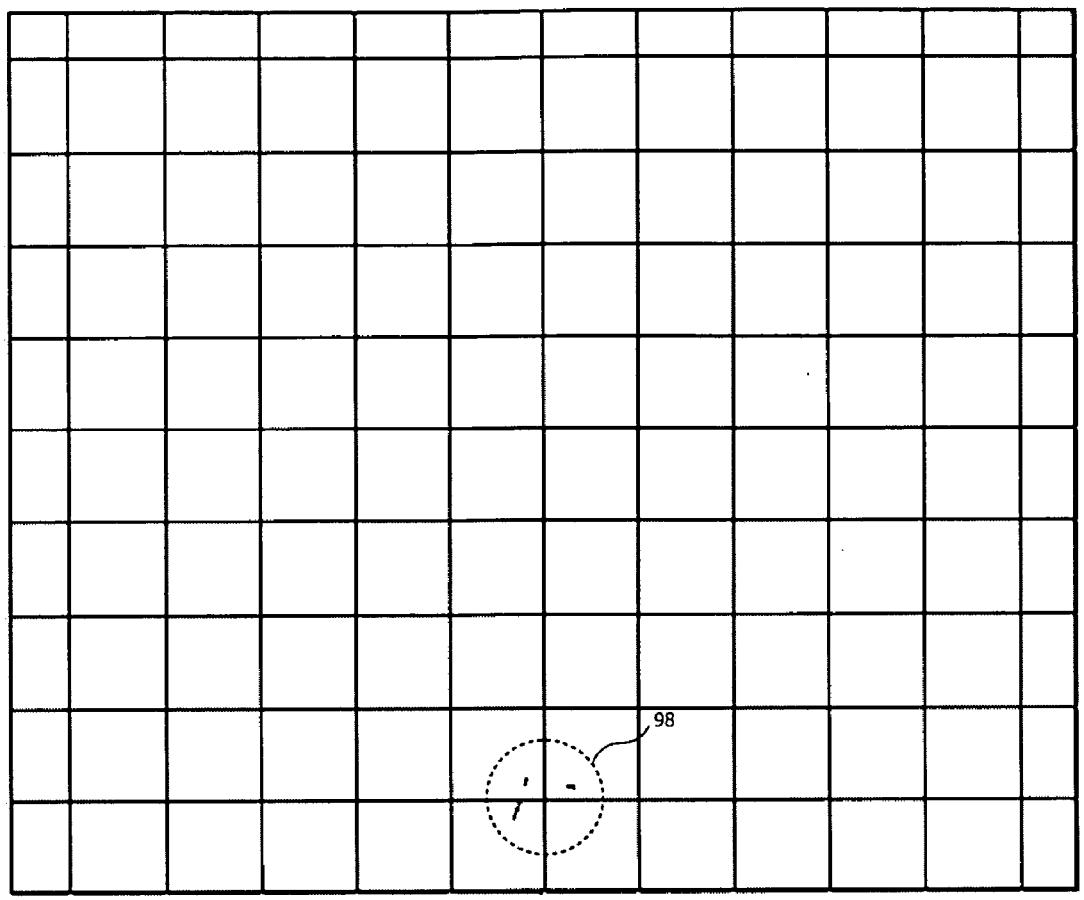

If an image including the line laser pattern of FIG. 19A is input to the camera module 240, the result of an experiment of simply applying only a single convolution kernel regardless of distance without using a combination of convolution kernel and the threshold value for each distance according to the present invention (hereinafter referred to as a "comparison embodiment") is shown in FIG. 19b. It can be seen through the result of the experiment that an easily recognizable part and an unrecognizable part exist together depending on the distance. A map, generated by applying a distance calculation using a triangulation method to the result of line pattern processing obtained by the comparison embodiment as in the example of FIG. 11, is shown in FIG. 19C. It can be seen that since the result of line pattern processing is not clear, the shape of the obstacle 98 generated in the map of FIG. 19C may also not be clear.

Figure 19D:
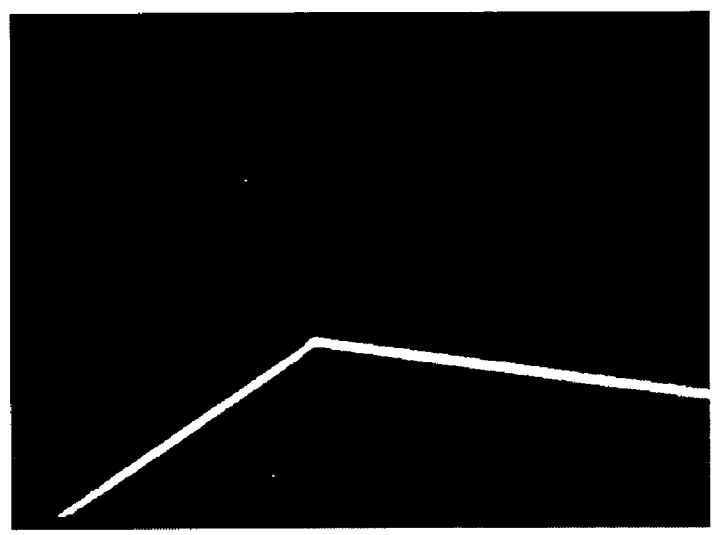
Figure 19E:
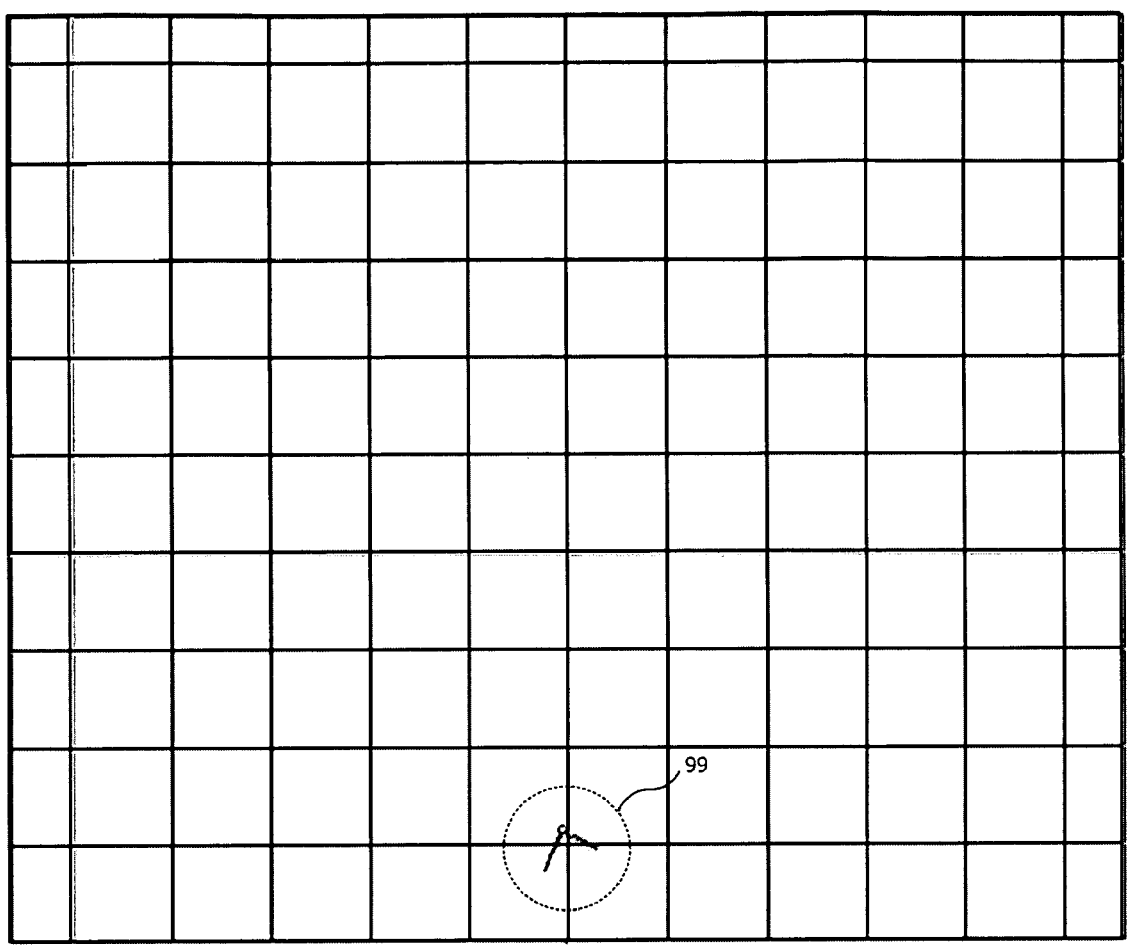

FIG. 19D is a view showing the result of line pattern processing obtained by applying the method of the present invention to the input image of FIG. 19A. Referring to the result, it can be seen that the line laser pattern of the input image is clearly shown regardless of distance. A map, generated by applying a distance calculation to the result of line pattern processing of FIG. 19D, is shown in FIG. 19E. Referring to FIG. 19E, the shape of the obstacle 99 corresponding to the line pattern can be clearly seen.

Figure 20A:
FIGS. 20A to 20C are views showing second experimental results obtained using the embodiment of the present invention and a comparison embodiment.
Figure 20B:
Figure 20C:

Meanwhile, FIGS. 20A to 20C are views showing the results of experiments conducted when a reflected line laser pattern exists. If the image of FIG. 20A is input, the result of line pattern processing obtained through the comparison embodiment is shown in FIG. 20B. Referring to FIG. 20B, a mirror effect exhibited in the input image is equally reflected and can be seen. Meanwhile, referring to FIG. 20C, which shows the result of line pattern processing according to the present invention, it can be seen that a reflected line pattern is eliminated, and only an original line pattern generated by the radiation of line laser light appears.

Accordingly, the above-described embodiments of the present invention can efficiently eliminate noise from an image generated by structured light.

Accordingly, the above-described embodiments of the present invention can efficiently eliminate, in particular, line pattern noise caused by a mirror effect.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for processing a line pattern, the apparatus including a light source module radiating predetermined light and a camera module capturing an image of an object, onto which the light is radiated, the apparatus processing a line pattern included in the captured image, comprising:
    a kernel learning unit determining a kernel shape and an optimal threshold value with respect to each vertical interval of the image using a simple line pattern formed at a predetermined location;
    a convolution application unit applying convolution to a captured test image using the determined kernel shape and optimal threshold value; and
    a region selection unit scanning each pixel column in the image, to which the convolution is applied, in a vertical direction, and setting pixel values of pixel groups other than a selected pixel group to 0 when a plurality of pixel groups having pixel values other than 0 exists.

2. The line pattern processing apparatus according to claim 1, wherein the light is line laser light.

3. The line pattern processing apparatus according to claim 1, wherein the camera module comprises a band pass filter receiving only a signal having a frequency close to the frequency of the laser light.

4. The line pattern processing apparatus according to claim 1, wherein the kernel shape includes −m, (n−m)/2 0s, m 1s, (n−m)/2 0s, and −m in order, m being the minimum kernel size and n being the maximum kernel size.

5. The line pattern processing apparatus according to claim 1, wherein the kernel shape includes two −m/2, (n−m)/2 0s, m 1s, (n−m)/2 0s, and two −m/2 in order, m being the minimum kernel size and n being the maximum kernel size.

6. The line pattern processing apparatus according to claim 4, wherein the optimal threshold value is determined using the minimum kernel size m.

7. The line pattern processing apparatus according to claim 5, wherein the optimal threshold value is determined using the minimum kernel size m.

8. The line pattern processing apparatus according to claim 1, further comprising a distance information calculation unit for calculating a distance to an obstacle by applying a triangulation method to an image having passed through the region selection unit.

9. The line pattern processing apparatus according to claim 1, wherein the convolution application unit allows only pixels exceeding the optimal threshold value to pass therethrough by applying a convolution kernel corresponding to the determined kernel shape to the test image while moving along each pixel column included in the test image.

10. A method of processing a line pattern, the method capturing an image of an object, onto which predetermined light is radiated, and processing a line pattern included in the captured image, comprising:
using at least one processing device determining a kernel shape and an optimal threshold value with respect to each vertical interval of the image using a simple line pattern formed at a predetermined location;
applying convolution to a captured test image using the determined kernel shape and optimal threshold value; and
scanning each pixel column included in the image, to which the convolution is to be applied, in a vertical direction, and setting pixel values of pixel groups, other than a selected pixel group, to 0 when a plurality of pixel groups having pixel values other than 0 exists.

11. The line pattern processing method according to claim 10, wherein the kernel shape includes −m, (n−m)/2 0s, m 1s, (n−m)/2 0s, and −m in order, m being the minimum kernel size and n being the maximum kernel size.

12. The line pattern processing method according to claim 10, wherein the kernel shape includes two −m/2, (n−m)/2 0s, m 1s, (n−m)/2 0s, and two −m/2 in order, m being the minimum kernel size and n being the maximum kernel size.

13. The line pattern processing method according to claim 11, wherein the optimal threshold value is determined using the minimum kernel size m.

14. The line pattern processing method according to claim 12, wherein the optimal threshold value is determined using the minimum kernel size m.

15. The line pattern processing method according to claim 10, further comprising calculating a distance to an obstacle by applying a triangulation method to an image output after the scanning has been performed.

16. The line pattern processing method according to claim 10, wherein the applying convolution comprises allowing only pixels exceeding the optimal threshold value to pass therethrough by applying a convolution kernel corresponding to the determined kernel shape to the test image while moving along each pixel column included in the test image.

17. The line pattern processing method according to claim 10, wherein the determining a kernel shape comprises:
binarizing the simple line pattern image;
determining a minimum kernel size and a maximum kernel size depending on a vertical thickness of the line pattern of the binarized image, and selecting a kernel shape based on the determined minimum and maximum kernel sizes;
setting a threshold value interval using the minimum kernel size;
applying a convolution kernel to the image formed as the simple line pattern, using the selected kernel shape and a temporary threshold value belonging to the threshold value interval; and
changing the temporary threshold value to reduce an error between the binarized image and the image to which the convolution kernel is applied.

18. The line pattern processing method according to claim 17, wherein the determining a minimum kernel size and a maximum kernel size, applying a convolution kernel to the image, and changing a temporary threshold value are repeated until the error is less than a predetermined threshold value.

19. The line pattern processing method according to claim 10, wherein the scanning comprises:
scanning in a vertical direction a pixel group having pixel values other than 0 with respect to a certain pixel column of the test image;
determining whether a pixel thickness of a current pixel group is greater than that of a previously stored pixel group;
changing all pixel values of the previously stored pixel group to 0 when the pixel thickness of the current pixel group is greater than that of the previously stored pixel group; and
changing all pixel values of the current pixel group to 0 when the pixel thickness of the current pixel group is not greater than that of the previously stored pixel group.

20. A computer-readable storage medium encoded with processing instructions for causing a processor to execute a method of processing a line pattern, the method capturing an image of an object, onto which predetermined light is radiated, and processing a line pattern included in the captured image, the method comprising:
determining a kernel shape and an optimal threshold value with respect to each vertical interval of the image using a simple line pattern formed at a predetermined location;
applying convolution to a captured test image using the determined kernel shape and optimal threshold value; and
scanning each pixel column included in the image, to which the convolution is to be applied, in a vertical direction, and setting pixel values of pixel groups, other than a selected pixel group, to 0 when a plurality of pixel groups having pixel values other than 0 exists.

* * * * *